US011310743B2

United States Patent
Awater et al.

(10) Patent No.: US 11,310,743 B2
(45) Date of Patent: Apr. 19, 2022

(54) DETERMINING A TONE SEQUENCE FOR WAKE-UP PROCEDURES

(71) Applicant: QUALCOMM Incorporated, San Diego, CA (US)

(72) Inventors: Geert Arnout Awater, Groenekan (NL); Stephen Jay Shellhammer, Ramona, CA (US); Didier Johannes Richard Van Nee, Tull en 't Waal (NL); Bin Tian, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/924,567

(22) Filed: Jul. 9, 2020

(65) Prior Publication Data

US 2021/0014792 A1  Jan. 14, 2021

Related U.S. Application Data

(60) Provisional application No. 62/873,469, filed on Jul. 12, 2019.

(51) Int. Cl.
*H04W 52/02* (2009.01)
*H04L 27/26* (2006.01)
*H04L 1/00* (2006.01)

(52) U.S. Cl.
CPC ....... *H04W 52/0235* (2013.01); *H04L 1/0003* (2013.01); *H04L 1/0013* (2013.01);
(Continued)

(58) Field of Classification Search
CPC ......... H04W 52/0229; H04W 52/0235; H04W 52/0222; H04L 5/0048; H04L 27/2614;
(Continued)

(56) References Cited

U.S. PATENT DOCUMENTS

2018/0019902 A1\*  1/2018  Suh ..................... H04L 27/2602
2018/0176053 A1\*  6/2018  Park ....................... H04L 27/04
(Continued)

OTHER PUBLICATIONS

Huang (Intel) P K., "Comments on TGba D3.0", IEEE 802.11-19/1016r6, Jul. 2, 2019 (Jul. 2, 2019), XP002800458, 1 Page, Retrieved from the Internet: URL: https://mentor.ieee.org/802.11/documents?is_dcn=comments%20on%20TGba%20, [retrieved on Sep. 24, 2020], the whole document.

(Continued)

*Primary Examiner* — Jung Liu
(74) *Attorney, Agent, or Firm* — Holland & Hart LLP

(57) ABSTRACT

This disclosure provides systems, methods, and apparatuses, including computer programs encoded on computer storage media, for determining one or more tone sequences (for example, for wake-up procedures). In one aspect, an access point (AP) may wake a mobile station (STA) from a low power mode using a wake-up packet, where an ON symbol of the wake-up packet is modulated using a tone sequence. To reduce the likelihood of a STA falsely identifying the ON symbol as a packet preamble, the AP may implement a tone sequence that satisfies a correlation metric threshold. For example, for a set of candidate tone sequences, each tone sequence may be associated with a correlation metric and peak-to-average-power ratio (PAPR) coordinate pair, and the tone sequence for modulating the ON symbol of the wake-up packet may be selected from a lower convex hull of the coordinate pairs.

30 Claims, 13 Drawing Sheets

(52) U.S. Cl.
CPC .......... *H04L 1/0021* (2013.01); *H04L 1/0033* (2013.01); *H04L 27/2614* (2013.01); *H04W 52/0222* (2013.01); *H04L 1/0016* (2013.01)

(58) Field of Classification Search
CPC ... H04L 1/0003; H04L 1/0021; H04L 1/0033; H04L 1/0013; H04L 1/0016; H04L 27/2613; Y02D 30/70
See application file for complete search history.

(56) References Cited

U.S. PATENT DOCUMENTS

| | | | | |
|---|---|---|---|---|
| 2019/0313337 | A1* | 10/2019 | Wilhelmsson | H04W 52/0229 |
| 2019/0313338 | A1* | 10/2019 | Wilhelmsson | H04W 52/0229 |
| 2020/0022082 | A1* | 1/2020 | Ljung | H04W 68/005 |
| 2020/0163017 | A1* | 5/2020 | Priyanto | H04W 88/04 |

OTHER PUBLICATIONS

International Search Report and Written Opinion—PCT/US2020/041575—ISAEPO—dated Oct. 6, 2020 (193489WO).
LAN/MAN Standards Committee of the IEEE Computer Society: "IEEE Draft, Draft P802.11BA D3.0", IEEE-SA, Piscataway, NJ USA, vol. 802.11ba drafts, No. D3.0, Jun. 1, 2019 (Jun. 1, 2019), pp. 1-182, XP068150640, Retrieved from the Internet: URL: http://www.ieee802.org/11/private/Draft_Standards/11ba/Draft%20P802.11ba%20D3.0.pdf, [retrieved on Jun. 1, 2019], p. 180-p. 181, paragraph [30.3.4.1]-paragraph [30.3.4.2], paragraph [4.3.15a].

* cited by examiner

DETERMINING A TONE SEQUENCE FOR WAKE-UP PROCEDURES

CROSS-REFERENCE TO RELATED APPLICATION

The present application for Patent claims the benefit of U.S. Provisional Patent Application No. 62/873,469 by AWATER et al., filed Jul. 12, 2019, entitled "DETERMINING A TONE SEQUENCE FOR WAKE-UP PROCEDURES," assigned to the assignee hereof, and expressly incorporated herein.

TECHNICAL FIELD

This disclosure relates generally to wireless communications, and more specifically to determining a tone sequence for wake-up procedures.

DESCRIPTION OF THE RELATED TECHNOLOGY

Wireless communications systems are widely deployed to provide various types of communication content such as voice, video, packet data, messaging, broadcast, and so on. These systems may be multiple-access systems capable of supporting communication with multiple users by sharing the available system resources (such as time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink and uplink transmissions. The downlink (or forward link) may refer to the communication link from the AP to the STA, and the uplink (or reverse link) may refer to the communication link from the STA to the AP.

SUMMARY

The systems, methods, and devices of this disclosure each have several innovative aspects, no single one of which is solely responsible for the desirable attributes disclosed herein.

One innovative aspect of the subject matter described in this disclosure may be implemented in an apparatus of an access point (AP) for wireless communications. The apparatus may include a processing system and an interface. The processing system may be configured to determine that a station (STA) associated with the AP is to be awakened from a low power mode and generate a wake-up packet for reception by a wake-up radio of the STA to trigger wake-up of the STA, the wake-up packet including a tone sequence for an ON symbol of the wake-up packet, where the tone sequence satisfies a correlation metric threshold. The interface may be configured to output the wake-up packet for transmission to the STA.

Another innovative aspect of the subject matter described in this disclosure may be implemented in an additional apparatus of an AP for wireless communications. The apparatus may include a processor, memory coupled with the processor, and instructions stored in the memory. The instructions may be executable by the processor to cause the apparatus to determine that a STA associated with the AP is to be awakened from a low power mode, generate a wake-up packet for reception by a wake-up radio of the STA to trigger wake-up of the STA, the wake-up packet including a tone sequence for an ON symbol of the wake-up packet, where the tone sequence satisfies a correlation metric threshold, and transmit the wake-up packet to the STA.

Another innovative aspect of the subject matter described in this disclosure may be implemented in an additional apparatus of an AP for wireless communications. The apparatus may include means for determining that a STA associated with the AP is to be awakened from a low power mode, means for generating a wake-up packet for reception by a wake-up radio of the STA to trigger wake-up of the STA, the wake-up packet including a tone sequence for an ON symbol of the wake-up packet, where the tone sequence satisfies a correlation metric threshold, and means for transmitting the wake-up packet to the STA.

Another innovative aspect of the subject matter described in this disclosure may be implemented in a method for wireless communications at an apparatus of an AP. The method may include determining that a STA associated with the AP is to be awakened from a low power mode, generating a wake-up packet for reception by a wake-up radio of the STA to trigger wake-up of the STA, the wake-up packet including a tone sequence for an ON symbol of the wake-up packet, where the tone sequence satisfies a correlation metric threshold, and transmitting the wake-up packet to the STA.

Another innovative aspect of the subject matter described in this disclosure may be implemented in a non-transitory computer-readable medium storing code for wireless communications at an apparatus of an AP. The code may include instructions executable by a processor to determine that a STA associated with the AP is to be awakened from a low power mode, generate a wake-up packet for reception by a wake-up radio of the STA to trigger wake-up of the STA, the wake-up packet including a tone sequence for an ON symbol of the wake-up packet, where the tone sequence satisfies a correlation metric threshold, and transmit the wake-up packet to the STA.

In some implementations of the method, apparatuses, and non-transitory computer-readable medium described herein, the correlation metric threshold may be a maximum correlation metric threshold and the tone sequence may include a maximum correlation metric that satisfies the maximum correlation metric threshold by being less than the maximum correlation metric threshold.

In some implementations of the method, apparatuses, and non-transitory computer-readable medium described herein, satisfaction of the maximum correlation metric threshold may be based on each of a set of cyclic shifts of the ON symbol satisfying the maximum correlation metric threshold.

In some implementations of the method, apparatuses, and non-transitory computer-readable medium described herein, satisfaction of the maximum correlation metric threshold may be based on a maximum value of a set of absolute values of normalized auto-correlations over one or more sample start times of the tone sequence, one or more repetition numbers of the tone sequence, or a combination thereof In some implementations of the method, apparatuses, and non-transitory computer-readable medium described herein, the normalized auto-correlations correspond to repetition intervals over a length of time equal to a short training sequence duration within the ON symbol using the tone sequence.

In some implementations of the method, apparatuses, and non-transitory computer-readable medium described herein, the tone sequence further includes a maximum peak-to-average-power ratio (PAPR) that satisfies a maximum PAPR threshold by being less than the maximum PAPR threshold. In some implementations of the method, apparatuses, and non-transitory computer-readable medium described herein, satisfaction of the maximum PAPR threshold may be based on each of a set of cyclic shifts of the ON symbol satisfying the maximum PAPR threshold.

In some implementations of the method, apparatuses, and non-transitory computer-readable medium described herein, the tone sequence includes a binary phase shift keying (BPSK) modulated tone sequence, a quadrature phase shift keying (QPSK) modulated tone sequence, a quadrature amplitude modulated (QAM) tone sequence, or a combination thereof.

Some implementations of the method, apparatuses, and non-transitory computer-readable medium described herein may further include operations, features, means, or instructions for selecting a data rate for the ON symbol of the wake-up packet and determining the tone sequence based on the data rate.

In some implementations of the method, apparatuses, and non-transitory computer-readable medium described herein, the data rate includes a high data rate and the ON symbol spans a first time period and uses a first number of subcarriers, or the data rate includes a low data rate and the ON symbol spans a second time period longer than the first time period and uses a second number of subcarriers greater than the first number of sub carriers.

In some implementations of the method, apparatuses, and non-transitory computer-readable medium described herein, the tone sequence may include one of the following sequences: [1 –1 1 1 –1 –1 0 –1 1 1 –1 –1 –1], [–1 1 1 –1 –1 1 0 1 –1 –1 –1 –1 –1], [1 –1 1 1 –1 1 0 1 1 1 –1 –1 –1], [1 –1 1 –1 –1 –1 0 –1 1 –1 –1 –1 –1], [–1 1 –1 1 1 –1 0 1 1 –1 –1 –1 –1], or [–1 1 1 1 –1 1 0 –1 –1 –1 1 –1 –1].

Another innovative aspect of the subject matter described in this disclosure may be implemented in an additional apparatus for selection of a tone sequence. The apparatus may include a processing system and a memory. The processing system may be configured to identify a set of candidate tone sequences, store, in the memory and in association with an identifier for corresponding candidate tone sequences, a correlation metric and a PAPR for each of the set of candidate tone sequences, associate the correlation metric and the PAPR for each of the set of candidate tone sequences into a set of coordinate pairs, each pair representative of one of the set of candidate tone sequences, identify one or more of the coordinate pairs that define a lower convex hull of the set of coordinate pairs, and select the tone sequence for an ON symbol of a wake-up packet from the one or more coordinate pairs that define the lower convex hull.

Another innovative aspect of the subject matter described in this disclosure may be implemented in an additional apparatus for selection of a tone sequence. The apparatus may include a processor, memory coupled with the processor, and instructions stored in the memory. The instructions may be executable by the processor to cause the apparatus to identify a set of candidate tone sequences, store, in memory and in association with an identifier for corresponding candidate tone sequences, a correlation metric and a PAPR for each of the set of candidate tone sequences, associate the correlation metric and the PAPR for each of the set of candidate tone sequences into a set of coordinate pairs, each pair representative of one of the set of candidate tone sequences, identify one or more of the coordinate pairs that define a lower convex hull of the set of coordinate pairs, and select the tone sequence for an ON symbol of a wake-up packet from the one or more coordinate pairs that define the lower convex hull.

Another innovative aspect of the subject matter described in this disclosure may be implemented in an additional apparatus for selection of a tone sequence. The apparatus may include means for identifying a set of candidate tone sequences, means for storing, in memory and in association with an identifier for corresponding candidate tone sequences, a correlation metric and a PAPR for each of the set of candidate tone sequences, means for associating the correlation metric and the PAPR for each of the set of candidate tone sequences into a set of coordinate pairs, each pair representative of one of the set of candidate tone sequences, means for identifying one or more of the coordinate pairs that define a lower convex hull of the set of coordinate pairs, and means for selecting the tone sequence for an ON symbol of a wake-up packet from the one or more coordinate pairs that define the lower convex hull.

Another innovative aspect of the subject matter described in this disclosure may be implemented in a method for selection of a tone sequence. The method may include identifying a set of candidate tone sequences, storing, in memory and in association with an identifier for corresponding candidate tone sequences, a correlation metric and a PAPR for each of the set of candidate tone sequences, associating the correlation metric and the PAPR for each of the set of candidate tone sequences into a set of coordinate pairs, each pair representative of one of the set of candidate tone sequences, identifying one or more of the coordinate pairs that define a lower convex hull of the set of coordinate pairs, and selecting the tone sequence for an ON symbol of a wake-up packet from the one or more coordinate pairs that define the lower convex hull.

Another innovative aspect of the subject matter described in this disclosure may be implemented in a non-transitory computer-readable medium storing code for selection of a tone sequence. The code may include instructions executable by a processor to identify a set of candidate tone sequences, store, in memory and in association with an identifier for corresponding candidate tone sequences, a correlation metric and a PAPR for each of the set of candidate tone sequences, associate the correlation metric and the PAPR for each of the set of candidate tone sequences into a set of coordinate pairs, each pair representative of one of the set of candidate tone sequences, identify one or more of the coordinate pairs that define a lower convex hull of the set of coordinate pairs, and select the tone sequence for an ON symbol of a wake-up packet from the one or more coordinate pairs that define the lower convex hull.

Some implementations of the method, apparatuses, and non-transitory computer-readable medium described herein to identify the one or more of the coordinate pairs that define the lower convex hull of the set of coordinate pairs may further include operations, features, means, or instructions for identifying a first coordinate pair of the set of coordinate pairs having a smallest correlation metric, identifying a second coordinate pair of the set of coordinate pairs having a steepest negative slope with respect to the first coordinate pair, and identifying additional coordinate pairs of the set of coordinate pairs, each of the additional coordinate pairs having a correlation metric that is greater than that of a most recently identified coordinate pair and having a steepest negative slope with respect to the most recently identified coordinate pair, where the first coordinate pair, the second coordinate pair, and the additional coordinate pairs form the one or more of the coordinate pairs that define the lower convex hull of the set of coordinate pairs.

Some implementations of the method, apparatuses, and non-transitory computer-readable medium described herein may further include operations, features, means, or instructions for sorting the set of coordinate pairs based on the PAPR prior to identifying the first coordinate pair.

Some implementations of the method, apparatuses, and non-transitory computer-readable medium described herein to identify the one or more of the coordinate pairs that define the lower convex hull of the set of coordinate pairs may further include operations, features, means, or instructions for representing the set of coordinate pairs in a scatter plot with a first axis representing the correlation metric and a second axis representing the PAPR grid and identifying the one or more of the coordinate pairs that define the lower convex hull of the set of coordinate pairs includes.

In some implementations of the method, apparatuses, and non-transitory computer-readable medium described herein, the correlation metric for each candidate tone sequence of the set of candidate tone sequences includes a maximum correlation metric for each candidate tone sequence and the PAPR for each candidate tone sequence of the set of candidate tone sequences includes a maximum PAPR for each candidate tone sequence.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
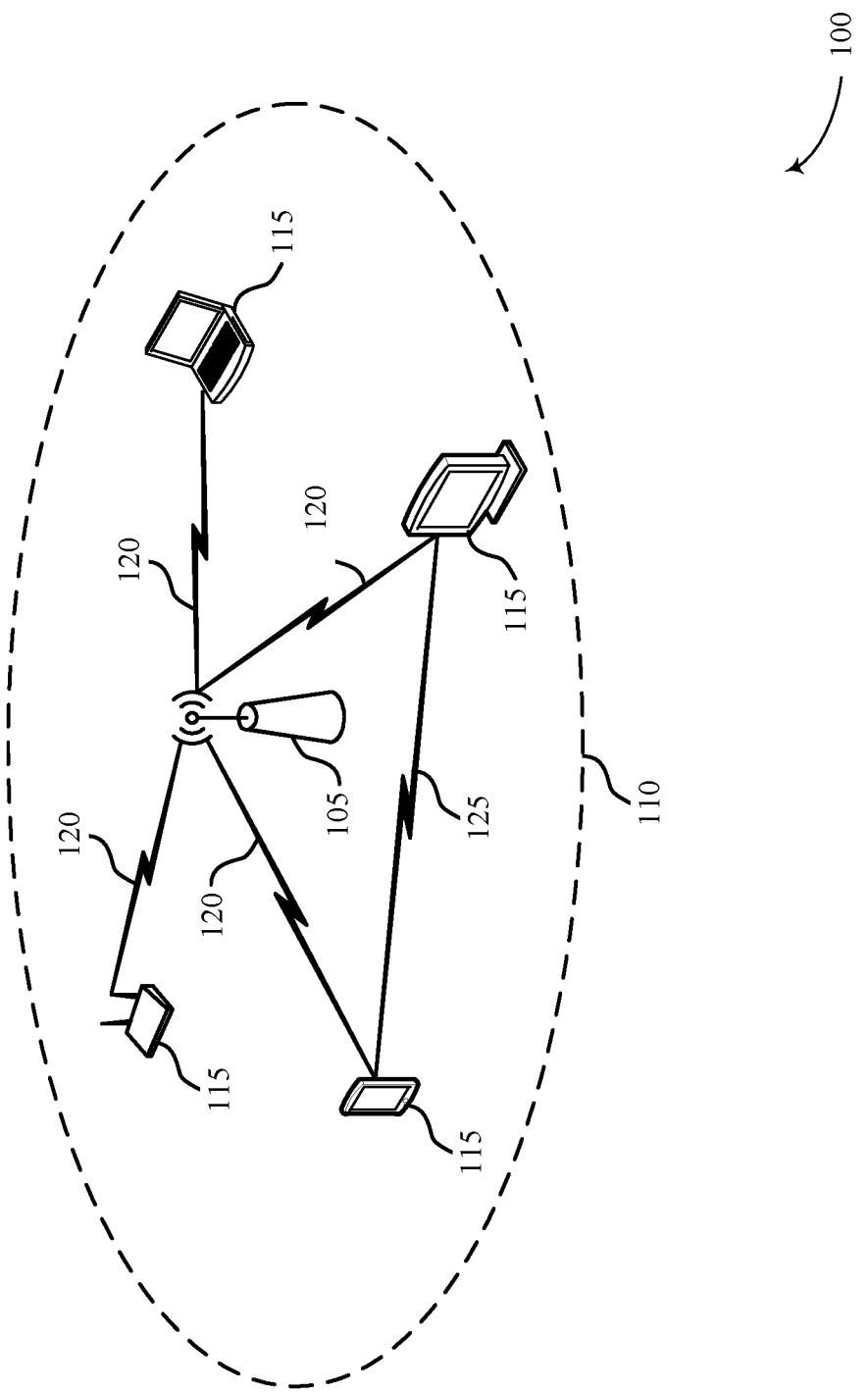
FIGS. 1 and 2 show examples of wireless communications systems that support determining tone sequences for wake-up procedures.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some implementations, a mobile station (STA) may be configured to operate in a deep sleep mode to conserve power and prolong battery life when the STA is idle. An access point (AP) may wake the STA from the low power mode by transmitting a wake-up packet to the STA. The STA may receive the wake-up packet using a receiver such as a wake-up radio. Based on receiving the wake-up packet, the wake-up radio may wake the STA from the low power mode (for example, by activating a main Wi-Fi radio at the STA) and begin a data exchange between the STA and the AP. By using wake-up radio functionality, the STA may operate according to an ultra-low power budget while maintaining high performance.

Transmissions to or from a STA may include a number of different packet types. For example, transmissions to or from a STA or within a wireless network may include wake-up packets, legacy packets such as legacy orthogonal frequency division multiplexing (OFDM) packets, and other packet types. A STA may be configured to receive legacy OFDM packets. Other types of packets may, therefore, include an OFDM preamble such that the STA may recognize the packet as one that is receivable by the STA. Some packets may contain preambles which contain information related to the packet type, or which may otherwise indicate the packet type to a receiving device. The preambles may additionally or alternatively indicate that the packet is to be received by the receiving device. For example, a wake-up packet may include an OFDM preamble that itself includes binary phase shift keying (BPSK) marker symbols which indicate that the packet is not a particular type of legacy packet. For example, a STA may refrain from classifying the wake-up packet as an 802.11n high throughput (HT) packet based on the BPSK marker symbols. In some other examples, the OFDM preamble may indicate that the packet is not receivable by the receiving device. For example, the receiving device may begin receiving the preamble of the OFDM packet, but may identify BPSK marker symbols indicating that the OFDM packet is not a valid OFDM packet. Based on identifying the BPSK marker symbols, the receiving device may transition to a defer mode such that the receiving device refrains from decoding the rest of the OFDM packet.

A legacy OFDM packet, as well as the OFDM preamble of a wake-up packet, may include a short training field (STF) containing repeated short training sequences. An STF may identify or otherwise indicate the presence of the OFDM packet or the OFDM preamble of a wake-up packet to the receiving device. The STA may determine a correlation metric between the short training sequences detected at the beginning of an OFDM packet transmission. For example, if the STA determines a high level of correlation between two or more subsequent short training sequences in a first portion of the OFDM preamble, the STA may determine that the packet is an OFDM packet, and thus may expect a second portion of the OFDM preamble including a long training field (LTF), a signal (SIG) field, or both.

In some implementations, however, the STA may not detect a preamble or a packet type indication. For example, the STA may not receive the preamble or identifier of a packet due to various factors, such as interference, or the STA may begin receiving the packet after the preamble or identifier has been transmitted. As a result, the STA may falsely detect one packet type for another. In one example, a STA may begin to detect the data field of a wake-up packet, and may falsely determine that the packet is an OFDM packet. This false determination may be a result of the STA determining a correlation metric on the received data field and determining that the received data field is correlated with an OFDM packet. In other words, if a data field of the wake-up packet is similar to an STF of a legacy OFDM packet, and if the STA did not properly receive or interpret the wake-up packet preamble, the STA may confuse the wake-up data field as a preamble for a legacy OFDM packet. For example, the STA may determine that a correlation metric value is above a threshold correlation value for a transmission the STA receives (such as a wake-up packet data field) and may determine that the transmission is part of a legacy OFDM preamble (such as where the STF contains short training sequences which have high correlation). As a result, the STA may incorrectly believe it has detected a legacy OFDM packet when it has instead detected a data field of the wake-up packet. Such false detection events may introduce network and communication inefficiencies. For example, the STA may falsely detect packet preambles multiple times during the transmission of the wake-up packet data field, which may cost the STA power, and may cause the STA to miss other transmissions. Additionally, or alternatively, frequent false detections may cause a STA to adjust a detection sensitivity (for example, a detection threshold) for receiving packets. Increasing the detection threshold may result in the STA failing to detect OFDM packets intended for the STA.

In order to reduce false detection events, various tone sequences may be used for modulating portions of the wake-up packet. In some implementations, a tone sequence may be determined and transmitted with the wake-up packet. The tone sequence may be determined to be one of a set of selected tone sequences, where each of the set of selected tone sequences may be associated with a correlation metric and a peak to average power ratio (PAPR), such as a low correlation metric and a low PAPR. The tone sequence used for a wake-up packet may satisfy (for example, include a correlation metric below) a correlation metric threshold, such as a maximum correlation metric threshold, which may reduce the likelihood that a STA mistakes the wake-up packet for an OFDM preamble, at least because the STA may determine that the wake-up packet transmission has a different correlation metric between transmission repetition intervals than in the OFDM preamble.

A device may determine one or more "optimal" tone sequences for a set of potential tone sequences. For example, the set of potential tone sequences may include any tone sequences possible for a given modulation scheme and data rate. In some implementations, for a tone sequence to be "optimal" (for example, supporting both reliable wake-up radio performance and a low likelihood of false triggering), no other tone sequence in the set of potential tone sequences may have both a lower correlation metric and a lower PAPR. To determine the "optimal" tone sequences, the device may identify the tone sequence with the smallest correlation metric as a first "optimal" tone sequence of the set of tone sequences. The device may determine correlation metric and PAPR metric coordinate pairs for each tone sequence and may iterate through the set to determine one or more additional "optimal" tone sequences. For example, based on a most recently identified "optimal" tone sequence, the device may determine a slope value calculated for each coordinate pair corresponding to a tone sequence with a lower PAPR than the most recently identified "optimal" tone sequence, and the device may identify the next "optimal" tone sequence as the sequence corresponding to the steepest (negative) slope. The device may repeat the iterative process using each identified "optimal" tone sequence until identifying a last "optimal" tone sequence (for example, the tone sequence of the set of potential tone sequences with the smallest PAPR metric). The device may output the determined set of "optimal" tone sequences, such as to an AP. The AP may be configured with an "optimal" tone sequence from the set of "optimal" tone sequences for modulating data portions of wake-up packets. In some examples, the device determining the set of "optimal" tone sequences may be a processing device operating at an original equipment manufacturer (OEM) (for example, not operating in a wireless communications system), and a resulting "optimal" tone sequence may be stored at a wireless device for communication, such as an AP or a STA.

Particular implementations of the subject matter described in this disclosure can be implemented to realize one or more of the following potential advantages. Utilizing an "optimal" tone sequence, as described herein, from a set of tone sequences to modulate portions of the wake-up packet may potentially reduce the number of false detections made by a STA. By limiting false detection events, the STA may reduce the amount of time the STA awaits receipt of a transmission and may increase the amount of time the STA may stay in a deep sleep or low-power mode. Thus, limiting false detections may increase the battery life of the STA. Additionally, or alternatively, reducing the number of false detections may increase throughput of a communication link between the STA and the AP or for other communication links within the network, which may further increase the battery life and longevity of the STA. In addition, limiting false detections may potentially reduce the amount of times where the STA misses receiving other packet transmissions designated for the STA. This may reduce the amount of times that a transmitting device, such as an AP, may re-transmit packets to the STA after the STA misses a reception opportunity. Additionally, or alternatively, limiting false detections may cause the STA to refrain from adjusting a detection sensitivity of the receiver. Such a sensitivity adjustment based on false detections may potentially result in the STA missing actual packets intended for the STA, so maintaining a sensitivity threshold due to limiting the false detections may support reliable packet reception at the STA and potentially reduce re-transmissions over the channel. Reducing re-transmissions may further reduce power consumption and increase communication efficiency by lowering channel overhead (and, accordingly, reducing latency) in the network.

FIG. 1 shows an example of a wireless communications system 100 that supports determining a tone sequence for a wake-up procedure. The system may be an example of a wireless local area network (WLAN) (such as a Next Generation, or Next Big Thing (NBT), or Extreme High Throughput (EHT) Wi-Fi network). The wireless communications system 100 may include an AP 105 and multiple associated STAs 115, which may represent devices such as mobile stations, personal digital assistant (PDAs), other handheld devices, netbooks, notebook computers, tablet computers, laptops, display devices (such as TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the wireless communications system 100. An extended network station (not shown) associated with the wireless communications system 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some implementations, the coverage area 110 of an AP 105 may be divided into sectors (also not shown). The wireless communications system 100 may include APs 105 of different types (such as metropolitan area, home network, etc.) with varying and overlapping coverage areas 110. Two STAs 115 also may communicate directly via a direct wireless link 125 regardless of whether both STAs 115 are in the same coverage area 110. Examples of direct wireless links 125 may include Wi-Fi Direct connections, Wi-Fi Tunneled Direct Link Setup (TDLS) links, and other group connections. STAs 115 and APs 105 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, 802.11ba, and subsequent versions. In some other implementations, peer-to-peer connections or ad hoc networks may be implemented within the wireless communications system 100.

In some implementations, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention-based environment (such as an environment supporting carrier-sense multiple access with collision avoidance (CSMA/CA)) because the STAs 115 may not refrain from transmitting on top of each other. A STA 115 whose transmissions are not identifiable, but that is within the same coverage area 110, may be known as a hidden node. CSMA/CA may be supplemented by the exchange of a request to send (RTS) packet transmitted by a sending STA 115 (or AP 105) and a clear to send (CTS) packet transmitted by the receiving STA 115 (or AP 105). This may alert other devices within range of the sender and receiver not to transmit for the duration of the primary transmission. Thus, RTS/CTS may help mitigate a hidden node problem.

In some implementations, STAs 115 in the wireless communications system 100 may operate in low power modes (i.e., sleep modes) when not communicating to conserve power. An AP 105 may transmit a wake-up packet to one or more STAs 115 to trigger wake-up of the STA(s) 115. For example, the AP 105 may wake up a STA 115 in order to transmit data to or receive data from the STA 115. The wake-up packet transmitted by the AP 105 may be generated using a tone sequence, where the tone sequence satisfies a correlation metric threshold. Based on using a tone sequence that satisfies the correlation metric threshold, the AP 105 may reduce the likelihood of triggering a STA 115 other than the STA 115 intended for wake-up.

Figure 2:
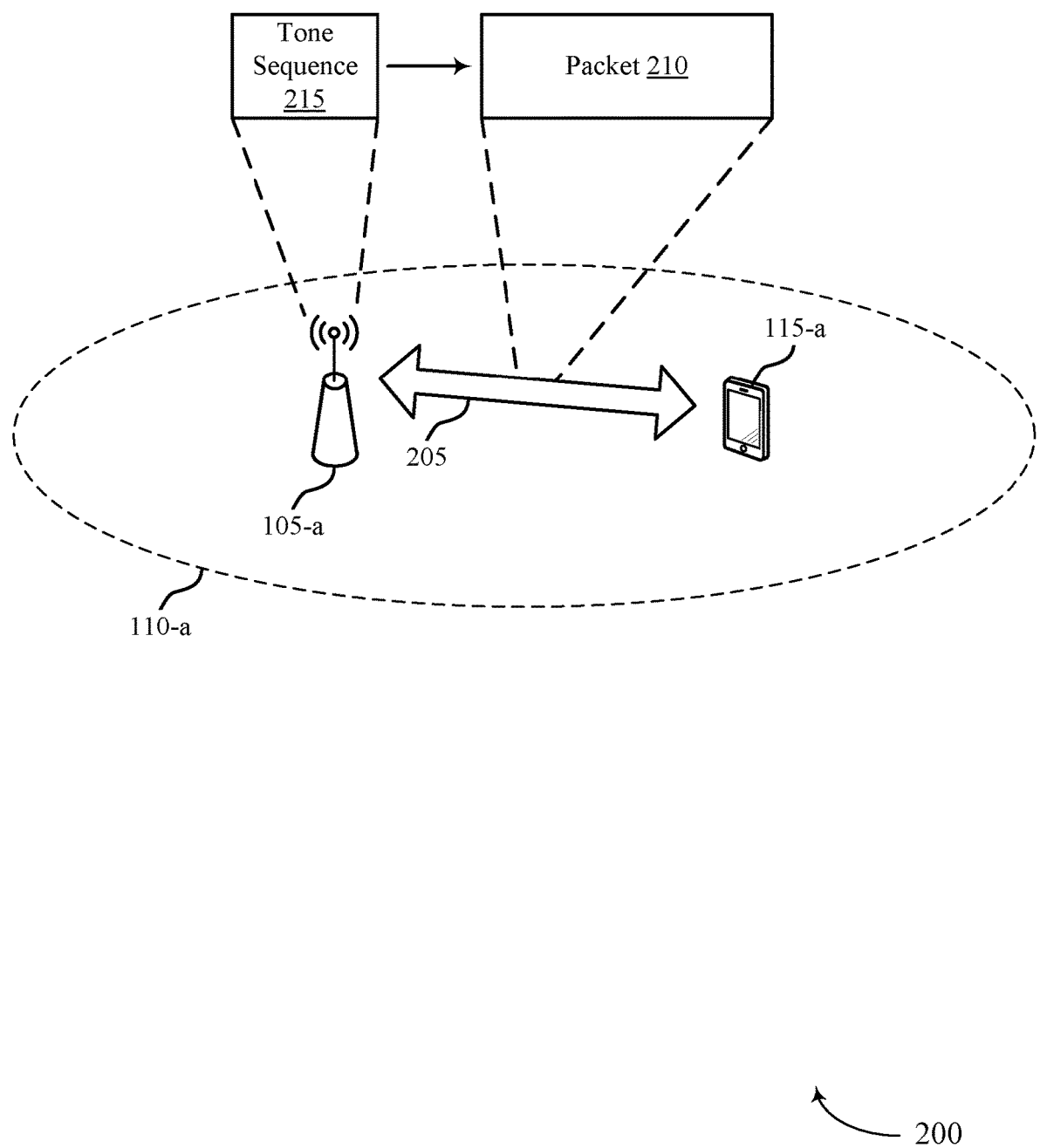

FIG. 2 shows an example of a wireless communications system 200 that supports determining a tone sequence for a wake-up procedure. The wireless communications system 200 may include an AP 105-a and a STA 115-a, which may be examples of the corresponding devices described with reference to FIG. 1. The AP 105-a may serve a coverage area 110-a. In some implementations, AP 105-a may transmit a wake-up packet 210 to STA 115-a to trigger a wake up process (ramping up power) at the STA 115-a. The AP 105-a may use a tone sequence 215 for generating the wake-up packet 210 that supports reliable reception at the STA 115-a while mitigating false triggering at other STAs 115 in the wireless communications system 200.

In some implementations, a STA 115-a may operate in a deep sleep mode to conserve power and prolong battery life. An AP 105-a may transmit a wake-up packet 210 to the STA 115-a for reception by a wake-up radio of the STA 115-a. The wake-up radio may be used to wake the STA 115-a from the deep sleep or another low power operating mode. The AP 105-a may wake up the STA 115-a using a low power auxiliary radio, which may enable longer sleep modes for the STA 115-a. Once the STA 115-a is awake (for example, based on the wake-up packet 210 transmission), data exchange between the devices may begin. For example, the AP 105-a may transmit data on the downlink to the STA 115-a, the STA 115-a may transmit data on the uplink to AP 105-a, or the STA 115-a may transmit or receive on a sidelink channel. In some examples, the STA 115-a may use a low power auxiliary radio to monitor for and receive the wake-up packet 210 while in a low power mode, and may use a main Wi-Fi radio when "awake" (when the STA 115-a operates in a full power mode). This wake-up procedure may support longer sleep modes for the main Wi-Fi radio, allowing the STA 115-a to operate with an ultra-low power budget, as operating the main Wi-Fi radio may use significantly more power than operating the low power auxiliary radio. These power savings may extend the battery life of devices (such as the STA 115-a) operating in the wireless communications system 200 while maintaining communication performance.

A communication link 205 may be established between radio devices (such as between the STA 115-a and the AP 105-a) using a main radio (such as a main Wi-Fi radio) at the STA 115-a while the devices are awake. The communication link 205 may support wake-up radio functionality in examples where the STA 115-a has entered a deep sleep mode. In such examples, the AP 105-a may transmit a wake-up packet 210 to the wake-up radio of the STA 115-a to wake up the STA 115-a. The AP 105-a may determine to wake up the STA 115-a in order to transmit data to the STA 115-a or to request data from the STA 115-a. In some implementations, the STA 115-a may not transmit a response (such as a positive acknowledgment (ACK) response) to the AP 105-*a* upon receiving the wake-up packet 210. In implementations described herein, a channel used to transmit the wake-up packet 210 may be different from the main Wi-Fi channel (for example, the wake-up channel may be one of a number of channels within the 2.4 gigahertz (GHz) band and the main Wi-Fi channel may be one of a number of channels within the 5 GHz band).

In some implementations, the wireless communications system 200 may contain a number of different wireless devices which may transmit information according to a number of different packet types. For example, a network may support wake-up packets and data packets, such as orthogonal frequency division multiplexing (OFDM) packets. Some packets may contain a preamble which may include information to indicate the packet type to a receiving device (such as the STA 115-*a*) and may indicate that the packet is to be received by the receiving device. For example, a wake-up packet may contain indicators or markers such as a particular set of binary phase shift keying (BPSK) symbols which may indicate that the packet is not a particular type of packet (for example, an 802.11n packet). Additionally, a preamble for some packets may include one or more short training fields (STFs) that contain short training sequences, where the short training sequences may identify the packet. The STA 115-*a* may use various techniques to identify a packet preamble, such as determining an autocorrelation metric between one or more pairs of STF candidates.

In some implementations, however, a receiving device such as the STA 115-*a* may not detect a preamble or may otherwise not be able to identify a packet type. For example, the STA 115-*a* may begin to receive a packet after the packet's preamble has been transmitted, or the STA 115-*a* may not receive the preamble due to various other factors such as interference, or the STA 115-*a* may begin receiving the packet after the preamble has been transmitted. As a result, the STA 115-*a* may falsely detect one packet type for another. For example, the STA 115-*a* may be awake, and may detect a wake-up packet 210 (intended to wake up a different STA 115). The STA 115-*a* may incorrectly identify the wake-up packet 210 as a data packet intended for the STA 115-*a*, because the data field of the wake-up packet 210 may be similar to the preamble of a data packet. That is, the STA 115-*a* may interpret a data field of the wake-up packet 210 as the sequence of STFs included in a packet preamble based on an autocorrelation value. For example, the tone sequence used by the AP 105-*a* for the wake-up packet 210 data field may have a high autocorrelation between transmission samples as determined by the STA 115-*a*. As a result, the STA 115-*a* may incorrectly determine that it has detected an OFDM data packet when it has actually detected a data field (for example, an on-off keying (OOK) portion) of a wake-up packet 210.

False detection events by the STA 115-*a* may introduce a number of inefficiencies into the network. For example, false detection may cost the STA 115-*a* power and may cause the STA 115-*a* to miss other transmissions while attempting to receive a non-existent data packet. In some implementations, the STA 115-*a* may false detect multiple times during the transmission of the wake-up packet 210 data field.

In order to reduce the number or likelihood of false detection events, various tone sequences may be used for modulating the data portions of the wake-up packet 210. In some implementations, a tone sequence 215 may be determined and used to generate the waveform for transmitting the wake-up packet 210. The tone sequence 215 may be determined to be one of a number of "optimal" tone sequences, where each "optimal" tone sequence may be associated with a low correlation metric and a low PAPR (or some other strong performance metric). For example, the tone sequence 215 used for the wake-up packet 210 may satisfy a maximum correlation metric threshold (meaning that the tone sequence 215 may be associated with a correlation metric that is less than the maximum correlation metric threshold), which may reduce the likelihood that a STA 115 mistakes an ON symbol of the wake-up packet 210 for a preamble of a different packet.

Certain modulation techniques may be used to encode the wake-up packet 210. Modulation types (for example, OOK, line coding, amplitude-shift keying modulation, etc.) may be used to enable the low power RF design for the wake-up packet 210. For some modulation types, such as OOK modulation, a device such as a STA 115-*a* or an AP 105-*a* may be configured to transmit power (for example, via a carrier waveform) for one or more ON states and refrain from transmitting (for example, reduce a transmit power to zero, refrain from sending a carrier waveform, etc.) for one or more OFF states. A device may use OOK over a particular bandwidth (such as 4 megahertz (MHz)) for transmitting symbols and other data (such that the ON symbols for OOK modulation may be configured to use the 4 MHz bandwidth). OOK may further be configured to operate according to different data rates. For example, an AP 105-*a* may transmit using a high data rate (such as 250 kilobits per second (kb/s)) or a low data rate (such as 62.5 kb/s).

Figure 3:
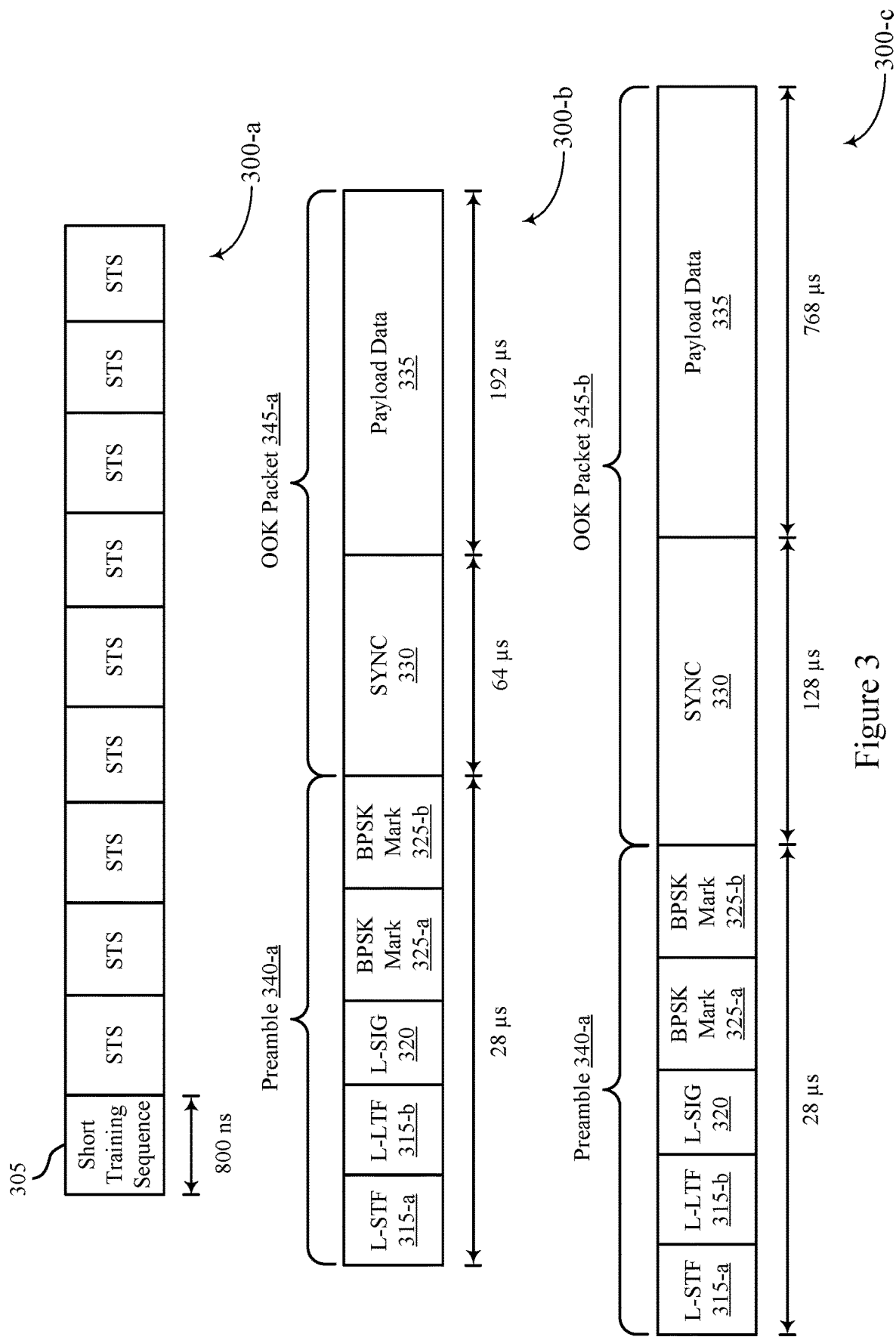
FIG. 3 shows packet structures for example signals.

FIG. 3 shows packet structures 300 for example signals. The packet structures 300 may be implemented by an AP 105 for transmitting Wi-Fi signals. The packet structure 300-*a* may correspond to an STF and the packet structures 300-*b* and 300-*c* may correspond to wake-up packets.

APs 105 and STAs 115 may transmit information according to a given packet structure 300. For example, an OFDM packet, such as a non-HT packet, an HT packet, a very high throughput (VHT) packet, a high efficiency (HE) packet, or some similar Wi-Fi packet, may begin with a short training field (STF) containing a set of repeated short training sequences 305 (for example, ten) according to a first packet structure 300-*a*. Each short training sequence 305 has a same duration in the time domain (for example, an 800 nanosecond (ns) duration), resulting in a total time duration for the STF, which may be referred to as a legacy STF (L-STF). In some implementations, the time duration of the L-STF may vary based on the channel bandwidth. Receivers in the network may use the short training sequences 305 for various input signal operations and to obtain information about the OFDM packet. For example, a receiver may use the short training sequences 305 for packet detection, automatic gain control (AGC), coarse time and frequency offset estimation, diversity selection, or some combination of these functions.

In some implementations, a device may detect the STF and determine that the STF is part of an OFDM packet header using various identification techniques such as, for example, determining an autocorrelation metric between one or more pairs of short training sequences 305 within the STF. In such implementations, a device may detect two or more short training sequences 305 and determine that the short training sequences 305 have a normalized autocorrelation metric that exceeds a threshold (for example, the STF has a relatively high autocorrelation between short training sequences 305). Based on this determination, the device may determine that the short training sequences are part of an STF for an OFDM packet. Accordingly, the device may determine to receive the OFDM data packet associated with the received STF based on the start-of-packet detection.

Wireless devices may respond in different ways to the detection of a wake-up packet. Some receiving devices may detect the start of a wake-up packet and may refrain from receiving the rest of the wake-up packet (for example, a receiving device may defer because the wake-up packet may not be designated for the receiving device). A receiving device may instead detect and receive packets designated for the receiving device. The wake-up packet may include a length field (for example, in a legacy signal (L-SIG) field 320) which specifies the packet as having a particular duration, so the receiving device may refrain from monitoring for a different packet in the same resources as the wake-up packet during the remainder of the packet duration.

However, in some implementations (for example, in a relatively busy network), a receiving device may not detect the full packet (for example, the receiving device may not detect the packet from start to finish) and instead may detect a portion of the packet. For example, the receiving device may detect the data portion of a packet (including synchronization information, a payload, or both) without the preamble 340. Not detecting the preamble 340 may be based on interference in the network or the device (for example, a half-duplex device) transmitting a signal when the preamble 340 would be received. The receiving device may falsely identify the data portion of the packet (for example, an OOK packet 345) as a preamble of a different packet type. For example, a device may receive the data portion of a wake-up packet and may falsely identify the data portion as an STF of a different packet based on the tone sequence of the data portion of the wake-up packet resembling repeated short training sequences 305. This false identification of a packet may be referred to as false triggering at the receiving device. Such false triggering based on a wake-up packet may cause the device to receive and attempt to decode an OFDM packet that is not being transmitted.

In some implementations, a device may use various detection techniques to determine certain characteristics of a received signal. The device may use these receive signal characteristics to determine whether the received signal is part of, for example, a packet preamble for a packet the device is to receive. In some examples, the receiving device may use autocorrelation techniques for determining characteristics of a received signal. Such techniques may be used to detect the start of a packet (for example, based on repeated short training sequences 305) based on one or more detection metrics. Autocorrelation techniques may involve a STA 115 determining an autocorrelation metric based on the normalized autocorrelation of one or more pairs of candidate short training sequences 305 (for example, signals received according to a short training sequence 305 format). An autocorrelation lag time for a STA 115 determining an autocorrelation metric may be equal to a short training sequence 305 duration, such as approximately 800 ns.

A receiving device may monitor for a first portion of a packet preamble, which may include an 8 microsecond (µs) waveform (for example, an L-STF) consisting of multiple (for example, ten) repeated short training sequences 305, and each short training sequence 305 may be approximately 800 ns in duration. In some examples, the receiving device may calculate an autocorrelation metric for a signal received over a first short training sequence duration and another signal received over a second short training sequence duration, where the signals are received on a same channel within a candidate STF duration. The receiving device may calculate the normalized autocorrelation for N received signals (for example, six) using an autocorrelation equation, such as Equation 1, over N short training sequences 305 or received signal periods:

$$C_{xx,N}(t) = \frac{1}{N-1} \sum_{k=0}^{(N-1)T-1} x_{t+k} x^*_{t+k+T} \Big/ \frac{1}{N} \sum_{k=0}^{NT-1} |x_{t+k}|^2 \quad (1)$$

where $x_t$ is the complex baseband signal at sample time t, and T is the duration of a short training sequence 305 in samples (for example, sixteen samples in an 800 ns time period sampled at 20 MHz). In some examples, other similar autocorrelation equations may be implemented. If the absolute value of the calculated autocorrelation metric, $C_{xx,N}(t)$, is relatively high (for example, above an autocorrelation threshold value, such as 0.3, 0.4, 0.5, 0.6, or some other threshold value) for the received signal over one or more pairs of short training sequences 305, the receiving device may determine that the received signal corresponds to an STF in a packet preamble 340, and the device may determine to receive the remainder of the packet (for example, the data portions).

In some implementations, methods of calculating autocorrelation to identify the start of a packet may introduce a number of challenges. For example, the receiving device may receive a number of highly correlated signals (for example, signals corresponding to a data payload portion of a wake-up packet) and may incorrectly determine that the signals are part of the start of an OFDM packet. The receiving device may false trigger receive processes for a new packet (even though the signal does not correspond to a new packet, but to a portion of a packet following a preamble 340 partially or fully missed by the receiving device). False triggering may occur in a network containing a number of devices transmitting packets of different types (such as wake-up packets, legacy data packets, etc.). In some examples, a particular preamble 340 (such as an L-STF 315-a in a preamble) for a wake-up packet may identify the wake-up packet and may trigger defer behavior for receiving devices that are not configured to receive wake-up packets or are already in full power modes. However, if this preamble 340 is missed (for example, due to interference or transmitting a partially concurrent message), a device may detect the data portion (such as a synchronization field 330, a payload data field 335, or both) of the packet and attempt to determine whether the signal corresponding to the data portion is a packet preamble. In some implementations, the receiving device may falsely trigger based on mistaking the synchronization field 330, the payload data field 335, or a portion of one or both of these fields for an L-STF preamble of an OFDM packet. In some implementations, an ON symbol included in the data portion of the wake-up packet may have repetitive characteristics that are similar to the rate at which the short training sequences 305 for an OFDM preamble repeats (for example, repetition within the ON waveform may occur at a similar rate as the expected repetition of short training sequences 305). Such repetition in the wake-up packet waveform may cause the ON symbols to frequently be mistaken for an STF of an OFDM packet preamble.

To reduce the likelihood of false identification of a packet preamble at a receiving device, ON symbols or constellations may be designed such that the ON symbols for portions of the detected packet are unlikely to trigger the autocorrelator of the receiving device. For example, the ON symbols may be configured such that the ON symbols result in low autocorrelation (according to a repetition duration for short training sequences 305).

Generally, a receiving device may identify the start of an OFDM packet if a value of a correlation metric calculated for received signals exceeds a threshold (for example, the autocorrelator may be triggered when the absolute value of the correlation metric exceeds a threshold correlation value). This relationship over N short training sequences 305 may be expressed by Equation 2:

$$|C_{xx,N}(t)| > Th, \quad (2)$$

where $C_{xx}$ is the correlation metric, t is the sample time, and Th is the threshold correlation value. N may be a number of different values, and may generally be between 2 and 6, although other values of N are possible. In addition, the threshold correlation value Th used to determine highly correlated transmissions may be static or dynamic. The correlation metric threshold value may be set to 0.3, 0.4, 0.5, 0.6, or a similar value, although other values are possible.

The effect of false triggering at a receiving device may occur upon determining high correlation for a signal that is not a packet preamble of a packet designated for the receiving device. Such false triggering events may be detrimental to OFDM receivers in a number of ways. For example, false triggering may cause the receiver to miss receiving other valid OFDM packets or may cause the receiving device to desensitize its receiver (for example, increasing a detection threshold at the receiver) in order to decrease sensitivity to system noise. Such effects may result in inefficiencies in the network.

Various packet structures may be used for wake-up packets in wake-up radio (WUR) applications. A wake-up packet may include 48 bits, although shorter or longer wake-up packets may be supported. In some implementations, a wake-up packet may include an OFDM preamble 340 that may span a bandwidth of 16.25 MHz. This OFDM preamble 340 may, in some aspects, be the same as or similar to a preamble 340 for other types of packets transmitted in the Wi-Fi network. This preamble 340 for the wake-up packet may be used to notify a receiving device of incoming transmissions and to prevent transmission collisions in the network. In addition to the OFDM preamble 340, the wake-up packet may contain other portions, including an OOK packet 345 (for example a data portion of the packet) containing a synchronization portion and a payload data portion. The OOK packet 345 may span a bandwidth of 4 MHz. In some implementations, the OFDM preamble 340 may cause a number of receiving devices (such as devices that do not support processing of wake-up packets) to defer from transmitting over the data portion of the packet (such as the OOK packet 345 following the preamble 340 for the wake-up packet).

In some implementations, a wake-up OOK packet 345 may be configured for different data rates. For example, packet structure 300-b may be configured for a high data rate (HDR) and packet structure 300-c may be configured for a low data rate (LDR). In some examples, the HDR may support a 250 kb/s data rate, while the LDR may support a 62.5 kb/s data rate, although other data rates are possible.

The HDR packet structure 300-b may include a 28 μs preamble 340-a which may include a number of training fields 315, including an L-STF 315-a and a legacy long training field (L-LTF) 315-b. In addition, the preamble 340-a may include an L-SIG field 320 and a number of BPSK markers 325, such as two BPSK markers 325-a and 325-b. A length field of the L-SIG field 320 may indicate a duration of the OOK packet 345-a of the wake-up packet. The BPSK markers 325 may differentiate the HDR packet from other types of packets (for example, the BPSK markers 325 may differentiate the packet from other 802.11n HT or 802.11ac VHT packets). In addition to the preamble 340-a, the HDR packet structure 300-b may include an OOK packet 345-a. The OOK packet 345-a may include a synchronization (SYNC) field 330 (such as a 32 bit SYNC field) which may be 64 μs in length. The OOK packet 345-a also may include a payload data field 335, which may be 192 μs in length.

The LDR packet structure 300-c may include the same portions as the HDR packet structure 300-b, but may be transmitted at a different data rate. For example, the LDR packet structure 300-c may include a 28 μs preamble 340-b which may include an L-STF 315-a and an L-LTF 315-b, an L-SIG field 320 containing information such as rate, length, parity information, etc. The LDR packet structure 300-c also may include the BPSK markers 325-a and 325-b. In addition to the preamble 340-b, the wake-up packet may include an OOK packet 345-b (for example, a data portion) containing a synchronization field 330 (such as a 64 bit SYNC field) and a payload data field 335. Based on the LDR packet having a lower data rate than the HDR packet, the synchronization field 330 for the LDR packet may span 128 μs in length, and the payload data field 335 for the LDR packet may span 768 μs in length.

In some implementations, the synchronization field 330 for the LDR packet structure 300-c may include more information than the synchronization field 330 for the HDR packet structure 300-b (for example, a 32 bit SYNC field for an HDR of 250 kb/s and a 64 bit SYNC field for an LDR of 62.5 kb/s). Additionally, or alternatively, the payload data field 335 for an LDR packet may contain the same number of payload bits or a different number of payload bits than the payload data field 335 for an HDR packet.

The OOK packet 345 may contain a number of symbols including ON symbols and OFF symbols. The ON symbols may be different for an OOK packet 345 based on the data rate for the packet. For example, an ON symbol for an HDR OOK packet 345-a may include 6 indexed OFDM subcarriers (for example, with indices {−6, −4, −2, 2, 4, 6} with respect to a reference subcarrier). The HDR ON symbol may have a 2 μs duration. An ON for an LDR OOK packet 345-b may include 12 indexed OFDM subcarriers (for example, with indices {−6, −5, −4, −3, −2, −1, 1, 2, 3, 4, 5, 6} with respect to a reference subcarrier). The LDR ON symbol may have a 4 μs duration.

The ON symbol of a packet may further be modulated according to a tone sequence, which may be referred to as a subcarrier data pattern, a set of values selected from a constellation, or values from an alphabet such as a QPSK alphabet. In some implementations, a transmitting device may select an arbitrary tone sequence for modulating an ON symbol of a packet. The selection of the tone sequence (for example, a constellation) may be subject to certain constraints such as tolerance constraints, signal flatness constraints, transmission characteristics, etc., such that a packet resulting from modulation may be received successfully. The tone sequence may be preconfigured at the transmitting device. In some examples, the tone sequence may be selected from a set of tone sequences defined in a standard, as described throughout. In some other examples, a single tone sequence may be defined in the standard, and each transmitting device may implement the tone sequence. In some implementations, the type of tone sequence, modulation scheme, or both used by the transmitting device may affect other parameters in the network.

The modulation technique used for the wake-up packet may include BPSK, quadrature phase shift keying (QPSK), or 2 n quadrature amplitude modulation (QAM), or any other supported modulation technique. In some implementations, a receiving device may not obtain information about a transmitted waveform (or other subcarrier data). As such, the receiving device may not identify a specific modulation scheme or waveform to monitor for, so the receiving device may monitor for any potential modulation scheme or waveform. For example, the receiving device may monitor for a transmitted power (or a lack of transmitted power) in a channel, rather than a specific type of waveform, to detect a wake-up packet.

In some implementations, HDR ON symbols may be used in the synchronization fields of both HDR and LDR packets. An LDR packet may include a SYNC ON/OFF bit pattern designated as {S,S}, while an HDR packet may include a SYNC ON/OFF bit pattern designated as the bit-wise complement of S. In one example, S={1, 0, 1, 0, 0, 1, 0, 0, 1, 0, 1, 1, 1, 0, 1, 1, 0, 0, 0, 1, 0, 1, 1, 1, 0, 0, 1, 1, 1, 0, 0, 0} and, accordingly, the bit-wise complement of S={0, 1, 0, 1, 1, 0, 1, 1, 0, 1, 0, 0, 0, 1, 0, 0, 1, 1, 1, 0, 1, 0, 0, 0, 1, 1, 0, 0, 0, 1, 1, 1}. This may result in the 32 bits for the HDR SYNC field and the 64 bits for the LDR SYNC field.

The data symbols for HDR and LDR wake-up packets may have different forms corresponding to different bit values. For example, an HDR data symbol may be {ON, OFF} for a bit value of 0 and {OFF, ON} for a bit value of 1. The duration of the HDR ON symbol may be 2 µs, for a full HDR data symbol duration of 4 µs. Additionally, or alternatively, an LDR data symbol structure may be {ON, OFF, ON, OFF} for a bit value of 0 and {OFF, ON, OFF, ON} for a bit value of 1. The duration of the LDR ON symbol may be 4 µs, for a full LDR data symbol duration of 16 µs. Other symbol types, lengths, and bitrates for HDR, LDR, or other data rates may be supported.

OOK encoding and modulation may have a number of benefits, including lowering the data rate for a packet, improving receiver sensitivity, supporting clock recovery, or some combination of these or other supported benefits. For example, OOK encoding and modulation may support power efficient radio receiver architectures such as super-regenerative radio receiver architectures, which may increase power savings for communications devices in a wireless network. The data may be encoded according to a number of different encoding types (for example, Manchester encoding may be implemented by a transmitting device).

In some implementations, however, the tone sequence used for modulating the ON symbol of an OOK packet 345 (for any data rate, such as an HDR or LDR) may result in a waveform resembling two or more repeated short training sequences 305. A receiver may confuse such a data portion (for example, the synchronization field 330, payload data field 335, or some portion of either or both) for a sequence of short training sequences 305 of an OFDM preamble 340. In such examples, the receiver may determine that it has detected a legacy OFDM packet, when it has actually detected a data portion of a wake-up packet. This false detection of a packet may incur a number of inefficiencies in the network and at associated receiving devices. For example, a receiving device may continue to receive a wake-up packet incorrectly identified as the preamble of a legacy packet, and after an amount of time may determine that the packet is not a legacy packet. In some implementations, the receiving device may continue false detecting throughout the duration of a wake-up packet transmission.

Such false detections may cause the receiving device to consume excess power. Furthermore, the receiver may miss other packet transmissions designated for the receiving device during such false detections, which may cause transmitting devices to re-transmit packets to the receiving device, increasing processing overhead at both the transmitting device and the receiving device and increasing signal overhead for the channel. To mitigate these inefficiencies, a transmitting device may use a tone sequence that reduces the probability of false detection at a receiving device.

Figure 4:
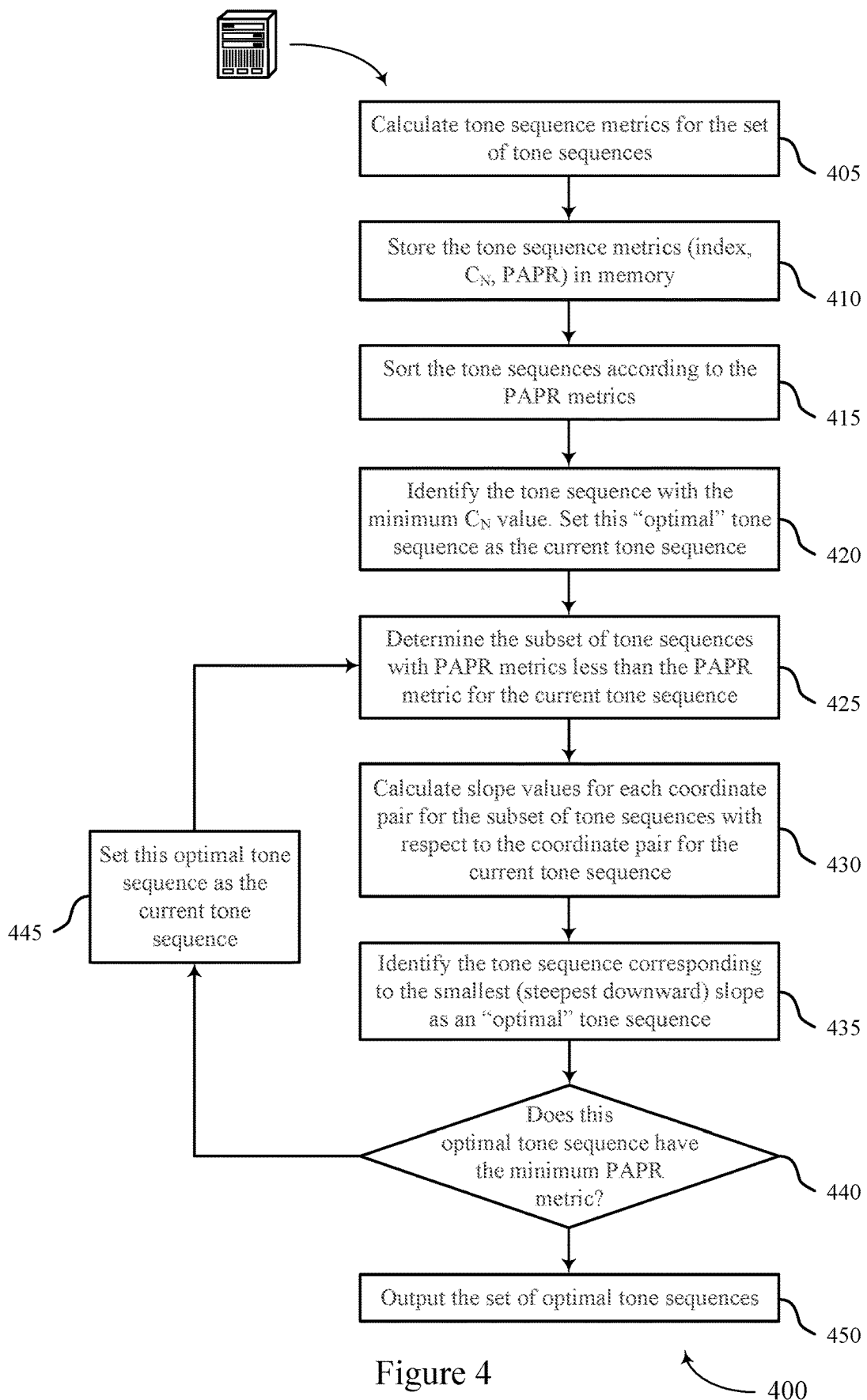
FIG. 4 shows an example flowchart for determining a tone sequence.

FIG. 4 shows an example flowchart 400 for determining a tone sequence. In some examples, the flowchart 400 may correspond to processes performed to determine a set of "optimal" tone sequences, from which a tone sequence may be selected for modulating wake-up packets. To reduce the likelihood of false triggering, a transmitting device (for example, an AP 105) may modulate an ON symbol using a tone sequence such that the resulting signal does not have a repetitive characteristic similar to the STF field of an OFDM preamble for a packet. Such a tone sequence may reduce autocorrelation and satisfy a maximum correlation metric threshold.

In some implementations, to maintain performance while reducing autocorrelation, the PAPR of the signal resulting from modulation using the tone sequence also may be optimized (for example, minimized). In some examples, reducing the PAPR may result in a low packet error rate (PER), supporting reliable reception at a receiving device (for example, a STA 115). In some examples, however, a low autocorrelation metric may not correspond to a low PAPR for a given tone sequence. As such, one or more tone sequences may be determined for modulation that support both a correlation threshold and a performance threshold.

Selecting an ON symbol (or, similarly, selecting a tone sequence for the ON symbol) may include selecting the ON symbol from a set of ON symbols (or a tone sequence from a set of tone sequences). In some aspects, there may be many different potential ON symbols from which to select, as the OFDM tones may be modulated by tone sequences of arbitrary complex numbers. However, the number of potential ON symbols from which to select may be reduced to a smaller set of ON symbols according to a number of constraints. In one example, the ON symbols may be limited based on a limited tone sequence alphabet size for a particular type of modulation. For example, the tone sequences may be limited to a BPSK constellation (such as values from the alphabet {−1,1}) or some other alphabet size (such as a QPSK alphabet size, a $2^n$ QAM alphabet size, etc.). Such parameters may reduce the number of different possible ON symbols to a finite set.

In some implementations, the number of different tones for a tone sequence may vary based on a number of factors, including the data rate and the modulation type. For example, the number of different tones may correspond to the alphabet size of the modulation type to the power of X, where X is the number of tones. Accordingly, an HDR ON symbol may use 6 tones, so BPSK modulation with an alphabet size of 2 may correspond to 64 possible tone sequences for the BPSK modulated HDR tone sequences (for example, $2^6$=64 different HDR tone sequences). In addition, for an LDR ON symbol using 12 tones, and a BPSK constellation with two possible values, there may be 4096 tone sequences for the BPSK modulated LDR tone sequence (for example, $2^{12}$=4096 different LDR sequences). In this implementation, limiting to a BPSK constellation may produce a finite set of HDR and LDR tone sequences.

In some other implementations, tone sequences may be modulated using various other modulation schemes. For example, the tone sequence may be a QPSK tone sequence, which may have 4 possible values for each OFDM tone in the ON symbol (for example, corresponding to the quadrature alphabet size). In the example of QPSK modulation, there may be $4^6$ different HDR tone sequences and $4^{12}$ different LDR tone sequences. Higher order modulation schemes also may be used in addition or alternative to QPSK, BPSK, or both.

Each potential ON symbol (determined by modulation) may be associated with a number of metrics including, for example, a maximum correlation metric and a PAPR value. For each tone sequence, correlation metrics, $|C\_(xx,N)(t)|$, may be calculated over all potential samples and a maximum correlation metric, $C_N$, may be determined for each tone sequence, where N is the number of short training sequences that the samples correlate over. Additionally, or alternatively, for each tone sequence, PAPRs also may be calculated, and a maximum PAPR value may be determined for each tone sequence. The values for both the maximum correlation metric and the maximum PAPR metric may be tabulated and indexed with an identifier for the corresponding tone sequence.

In some implementations, a cyclic shift may additionally be applied for each ON symbol. Accordingly, in some examples, the cyclic shift may be selected from a number of cyclic shift values (such as 8 different cyclic shift values) and applied to an ON symbol. To determine the metrics for each tone sequence, the maximum PAPR and maximum $C_N$ values may be selected from all of the possible cyclic shifts.

In some implementations, one or more "optimal" tone sequences may be determined algorithmically according to a number of processes as illustrated with reference to FIG. 4. For a tone sequence to be "optimal" with respect to the maximum correlation metrics and maximum PAPR metrics, no other tone sequence in the set of tone sequences may have both a lower maximum correlation metric and a lower maximum PAPR metric. The processing illustrated in FIG. 4 may be implemented by a number of different computing elements or devices including, for example, a server or server cluster, a virtual machine, a STA 115, an AP 105, or some other type of computing device. An example procedure for designing "optimal" ON waveforms is described below, where Q is the tone constellation size, and the processes may be performed in an alternative order and may include additional or alternative functions.

At 405, the device may calculate metrics for a set of tone sequences. For example, a maximum correlation metric, $C_N$, and a maximum PAPR metric may be calculated for each ON symbol modulated using a different tone sequence according to one or more particular modulation schemes, such as BPSK, QPSK, $2^N$ QAM, or one or more other modulation schemes.

At 410, the device may store an index, the $C_N$, and the maximum PAPR metric for each tone sequence in memory. For example, the values may be stored in a table, where each row of the table corresponds to a different tone sequence. Accordingly, the table in memory may include $Q^6$ row (for HDR ON symbols) or $Q^{12}$ rows (for LDR ON symbols) and 3 columns (for the three stored metrics). The index value stored in memory may uniquely identify each tone sequence (for example, there is a 1-to-1 mapping between a tone sequence and an index value).

At 415, the tone sequences stored in memory may be sorted according to the maximum PAPR metrics. For example, the table may be sorted in descending order, such that the greatest maximum PAPR metric is stored in the first row of the table and the smallest maximum PAPR metric is stored in the last row of the table.

At 420, the device may identify the tone sequence with the smallest $C_N$ value. For example, the device may determine the table row containing the smallest $C_N$ value, where the index value for this row identifies a first "optimal" tone sequence. This tone sequence may be "optimal" as it corresponds to the minimum $C_N$ of the set of tone sequences. This tone sequence may be set as the current tone sequence for the following iterative process.

At 425, the device may determine all tone sequences with maximum PAPR metrics less than the maximum PAPR metric for the current tone sequence. For example, the device may identify the k rows in the table below the current row (the row with the current tone sequence identified at 420). At 430, the device may determine slope values for each of the identified subset of tone sequences. The slope values may correspond to coordinate pairs, where each coordinate pair may be defined as the ($C_N$, maximum PAPR metric) for a respective tone sequence. The slope of a line from the coordinate pair ($C_N$, maximum PAPR metric) for the current tone sequence to the coordinate pair ($C_N$, PAPR) for each of the k tone sequences identified in the subset of tone sequences may be calculated. Each of these slopes may have negative values. At 435, the device may identify the tone sequence corresponding to the smallest (or steepest downward) slope calculated at 430. This tone sequence may be an additional "optimal" tone sequence. At 440, the device may determine if this additional "optimal" tone sequence contains the smallest maximum PAPR metric for the set of tone sequences. For example, the device may determine if this additional "optimal" tone sequence corresponds to the last row in the table. If this tone sequence does not correspond to the smallest maximum PAPR metric of the set of tone sequences, the device may iterate through the iterative process again at 445, using this additional "optimal" tone sequence as the current tone sequence.

If this tone sequence corresponds to the smallest maximum PAPR metric of the set of tone sequences, at 450, the device may output the determined set of "optimal" tone sequences. For example, the set of "optimal" tone sequences may include the first "optimal" tone sequence and each additional "optimal" tone sequence identified by the device. The coordinate pairs ($C_N$, maximum PAPR metric) for the set of "optimal" tone sequences may span a lower convex hull of the set of all coordinate pairs ($C_N$, maximum PAPR metric) for the set of tone sequences (for example, when plotted as coordinates in a scatterplot, as described herein with reference to FIG. 5).

Alternative procedures may be performed by a device to determine the set of "optimal" tone sequences. For example, different performance metrics may be used in place of the PAPR value. Additionally, or alternatively, the table sorting, coordinate pairs, or both may be defined in a different order. In some implementations, the device may output the full set of "optimal" tone sequences. A user or code may select one or more "optimal" tone sequences from the set of "optimal" tone sequences for configuration of an AP 105. In some other implementations, the device may output a subset of the "optimal" tone sequences according to one or more selection parameters.

"Optimal" tone sequences for N=2 and N=6 with LDR BPSK modulation and determined according to this procedure are tabulated in Table 1. However, the procedure may support any value of N and any modulation type.

TABLE 1

Example "Optimal" Tone Sequences

| | ID | Tone Sequence | PAPR | C2 | C6 |
|---|---|---|---|---|---|
| $C_2$ Optimized | A | 1 −1 1 −1 −1 −1 0 −1 1 −1 −1 −1 −1 | 5.071222 | 0.3286 | 0.2786 |
| | B | 1 −1 1 1 −1 −1 0 1 −1 −1 −1 −1 −1 | 4.183855 | 0.3930 | 0.2618 |
| | C | −1 1 1 −1 −1 1 0 −1 −1 −1 −1 −1 −1 | 2.862427 | 0.5987 | 0.3397 |
| | D | −1 1 −1 1 1 −1 1 0 1 1 −1 −1 −1 −1 | 2.283113 | 0.8405 | 0.5280 |
| | E | 1 −1 1 1 1 −1 1 0 1 1 1 −1 −1 −1 | 2.102629 | 0.9514 | 0.5709 |
| $C_6$ Optimized | F | −1 1 1 1 −1 1 0 −1 −1 −1 1 −1 −1 | 5.269695 | 0.4021 | 0.2157 |
| | G | 1 −1 1 1 −1 −1 0 1 −1 −1 −1 −1 −1 | | | Same as B |
| | H | −1 1 1 −1 −1 1 0 −1 −1 −1 −1 −1 −1 | | | Same as C |
| | I | 1 −1 1 1 −1 1 0 1 1 1 −1 −1 −1 | | | Same as E |

In some examples, "optimal" tone sequences using a same type of modulation but different N values (corresponding to different numbers of short training sequences to correlate over) may overlap. For example, Table 1 displays three common sequences between $C_2$ and $C_6$ correlation metrics for BPSK modulation. Accordingly, if an AP 105 uses tone sequence B, C, or E for modulating the ON symbol of a wake-up packet, the tone sequence may result in strong performance for any receiving devices correlating over 2 short training sequences or 6 short training sequences.

Figure 5:
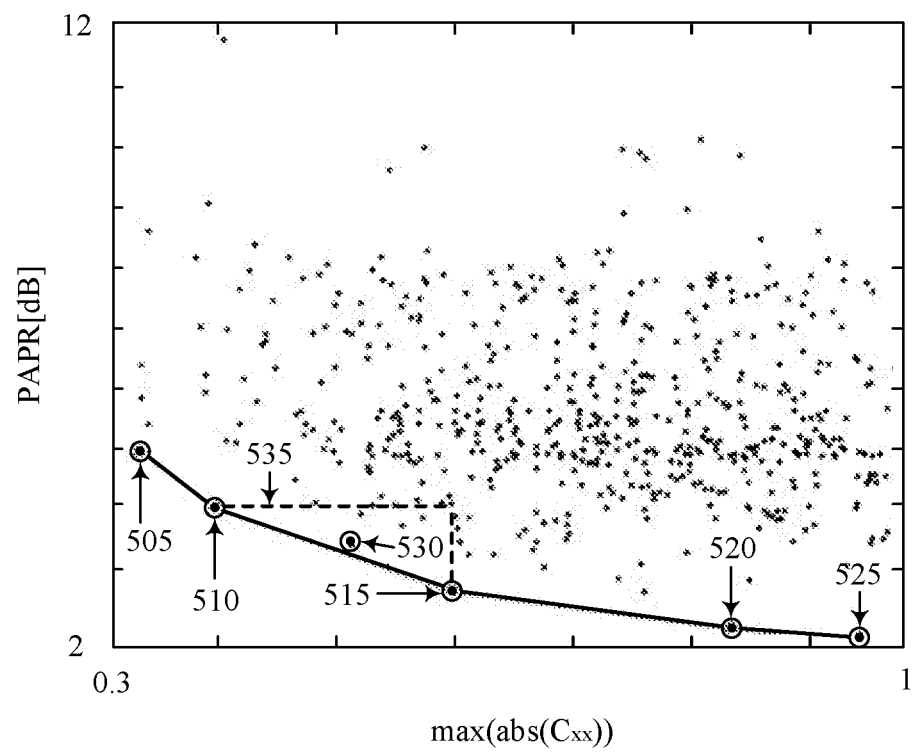
FIG. 5 shows an example plot for determining a tone sequence.

FIG. 5 shows an example plot 500 for determining a tone sequence. The plot 500 (and associated lower convex hull) may correspond to the flowchart 400 described with reference to FIG. 4. Coordinate pairs for each tone sequence of a set of possible tone sequences may be plotted in plot 500 (for example, a scatterplot). A device may determine values for the correlation metric $C_N$ and the maximum PAPR metric for each tone sequence. As illustrated in FIG. 5, $C_N$ and maximum PAPR metrics may be determined for LDR BPSK modulation and N=2. In this example, 4096 points may be produced on the plot corresponding to the 4096 possible ON waveforms for LDR BPSK modulation. However, some tone sequences may have equal correlation metrics and PAPR values, so the number of points may appear to be less than 4096 (as some points overlap). Other scatterplots may be determined for other data rates, modulation types, numbers of short training fields for correlation, or a combination thereof.

The plot illustrates a number of coordinate values for ($C_N$, maximum PAPR metric). In order to graphically determine the "optimal" tone sequences, coordinate pairs ($C_N$, PAPR) for tone sequences that span a lower convex hull of the set of all coordinate pairs may be selected (for example, coordinate pairs 505, 510, 515, 520, and 525). The number of "optimal" values selected may vary according to a number of factors, such as the value of N, the modulation type, the data rate, etc. For example, the described procedure may yield 5 "optimal" tone sequences for the $C_2$ correlation metric (for example, sequences associated with coordinate pairs 505, 510, 515, 520, and 525) and 4 "optimal" tone sequences for the $C_6$ correlation metric when operating using BPSK modulation and an LDR.

A point with the lowest correlation metric value or autocorrelation value may be selected first (a coordinate pair 505). Lines may be calculated to connect the coordinate pair 505 with all the points in the scatterplot that are below the horizontal location of coordinate pair 505. A second point (a coordinate pair 510) may be selected based on determining the line with the steepest downward slope from coordinate pair 505. Additional lines may be calculated to connect the second coordinate pair 510 to all of the points in the scatterplot that are below the horizontal location of the second coordinate pair 510. This procedure may be repeated until a final point is found with a lowest PAPR metric (coordinate pair 525). Optimal tone sequences may be associated with the optimal coordinate pairs 505, 510, 515, 520, and 525.

In some implementations, additional "optimal" tone sequences may be determined that do not lie on (or are not the vertices of) the lower convex hull of the plot 500. For example, a device may determine a set of "optimal" tone sequences, where a tone sequence is "optimal" if no other tone sequence of the set has both a lower $C_N$ metric and a lower PAPR metric. This set of "optimal" tone sequences may include points in the scatterplot that lie above the lower convex hull, such as coordinate pair 530, which has a lower PAPR metric than the vertex point to its left (for example, coordinate pair 510) and a lower $C_N$ metric than the vertex point on its right (for example, coordinate pair 515). In one example, the device may determine other "optimal" tone sequences by implementing a stepped approach between lower convex hull vertices (as illustrated by 535). Any coordinate pair that lies between 535 and the lower convex hull, such as coordinate pair 530, may possibly correspond to an "optimal" tone sequence (although not all of these coordinate pairs may be "optimal"). The device may implement a plot-based approach, table-based approach, algorithm-based approach, or some combination thereof to determine, for a set of tone sequences, the complete subset of "optimal" tone sequences, where no tone sequence of the set has both a lower $C_N$ metric and a lower PAPR metric than any "optimal" tone sequence. In some examples of an algorithm-based approach, the device may determine a resulting lower convex hull of the points inside of 535. The device may further calculate an additional lower convex hull using points of the resulting lower convex hull (for example, in an iterative or recursive process). The device may continue calculating additional lower convex hulls recursively for different sets of points to determine a subset of "optimal" tone sequences for the set of tone sequences.

Figure 6:
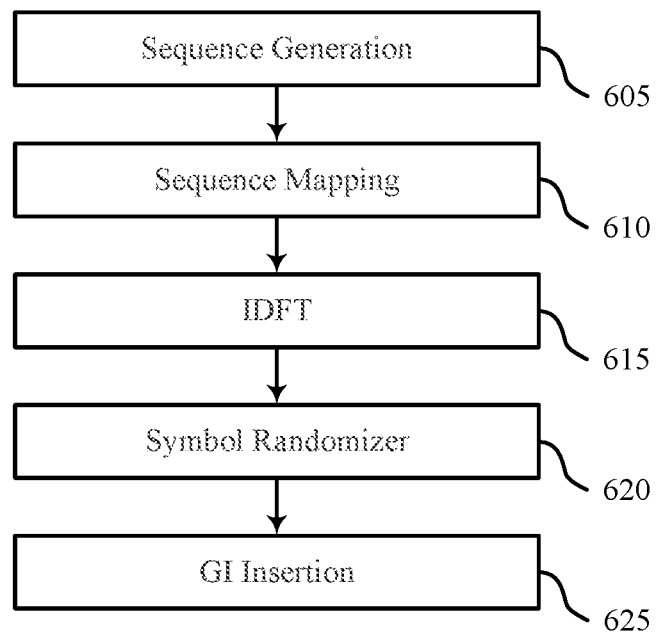
FIG. 6 shows an example waveform generation process using a determined tone sequence.

FIG. 6 shows an example waveform generation process 600 using a determined tone sequence. The waveform generation process 600 may be performed by a transmitting device, such as an AP 105 as described with reference to FIGS. 1-5. The AP 105 may generate one or more ON symbols based on this waveform generation procedure. At 605, the AP 105 may generate a tone sequence. This tone sequence may be an "optimal" tone sequence calculated based on a maximum correlation metric threshold. At 610, the AP 105 may map the tone sequence to an OFDM waveform. At 615, the AP 105 may apply an inverse discrete Fourier transform (IDFT) to the waveform and, at 620, may perform symbol randomization to the waveform (for example, by applying a cyclic shift). Applying a cyclic shift to an input waveform may include various processes such as those performed by a linear feedback shift register. For example, the linear feedback shift register may convert bits to integer values (such as −1 or +1), may look up a cyclic shift, and may apply the cyclic shift. The cyclic shift may be applied per antenna according to a cyclic shift diversity (CSD) or other transmit diversity scheme. The AP 105 may insert a guard interval at 625 and transmit the resulting waveform (for example, as an OOK portion of a wake-up packet.

For each of the sequences generated for BPSK, QPSK, or other modulation schemes, the sequence may go through the process to generate the sequence, map the sequence, apply an IDFT to the sequence, randomize the sequence, and insert a guard period for the sequence. In some implementations, the maximum correlation metrics and maximum PAPR metrics may be calculated for each generated sequence based on these processes (or after a subset of these processes). The values for the correlation metrics and PAPR metrics may be used in various applications (such as graphical or algorithmic applications) to determine "optimal" tone sequences for modulation.

Figure 7:
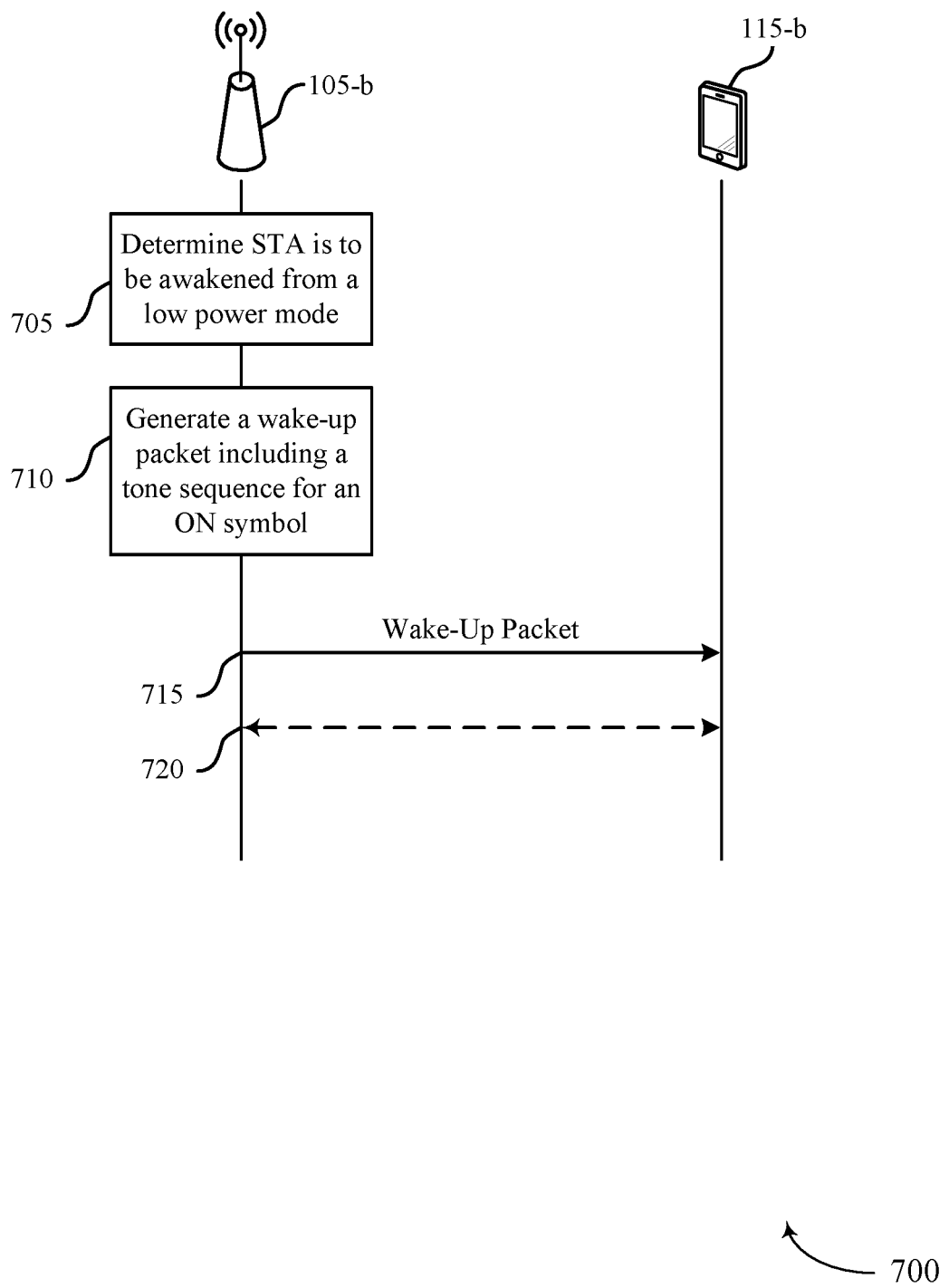
FIG. 7 shows an example flowchart for devices in a system.

FIG. 7 shows an example flowchart 700 for devices in a system. The example flowchart 700 may be performed by an AP 105-b and a STA 115-b, which may be examples of the corresponding devices described with respect to FIGS. 1-6. The AP 105-b may implement an "optimal" tone sequence for modulating a wake-up packet to improve transmission reliability and reduce false triggering.

At 705, the AP 105-b may determine that the STA 115-b is to be awakened from a low power mode such as a deep sleep mode. The AP 105-b may determine to wake the STA 115-b based on identifying data to transmit to the STA 115-b.

At 710, the AP 105-b may generate a wake-up packet for reception by a wake-up radio of the STA 115-b to trigger wake up of the STA 115-b. In some implementations, the wake-up packet may include a tone sequence for an ON symbol of the wake-up packet, where the tone sequence may satisfy a maximum correlation metric threshold. In some examples, the tone sequence may satisfy a maximum correlation metric threshold based on a number of cyclic shifts of the ON symbol satisfying the maximum correlation metric threshold. In addition, the tone sequence may be associated with a PAPR that is less than a maximum PAPR threshold based on the number of cyclic shifts of the ON symbol. In some other examples, the tone sequence may satisfy a maximum correlation metric based on a maximum value of a number of absolute values of normalized autocorrelation over one or more start times or repetition numbers of the tone sequence, or a combination thereof. In some examples, the tone sequence may include a BPSK, QPSK, QAM, or other modulated tone sequence.

In some implementations, the tone sequence may further be based on a data rate for the ON symbol of the wake-up packet. In some examples, the data rate may be an HDR and an ON symbol may span a first time period and be associated with a first number of subcarriers. In some other examples, the data rate may be an LDR and the ON symbol may span a second time period longer than the first time period. Additionally, or alternatively, the data rate may be the LDR and the ON symbol may use a second number of subcarriers greater than the first number of subcarriers.

At 715, the STA 115-b may transmit the wake-up packet to the STA 115-b. The wake-up packet may be received by the wake-up radio of the STA 115-b. For example, the STA 115-b may successfully receive the wake-up packet based on a low PAPR for the tone sequence. Additionally, other STAs 115 in the system may not false trigger on the wake-up packet based on a low correlation metric for the tone sequence.

At 720, the STA 115-b may wake up (for example, the STA 115-b may no longer operate in a low power or deep sleep mode), and the AP 105-b and the STA 115-b may communicate with one another.

Figure 8:
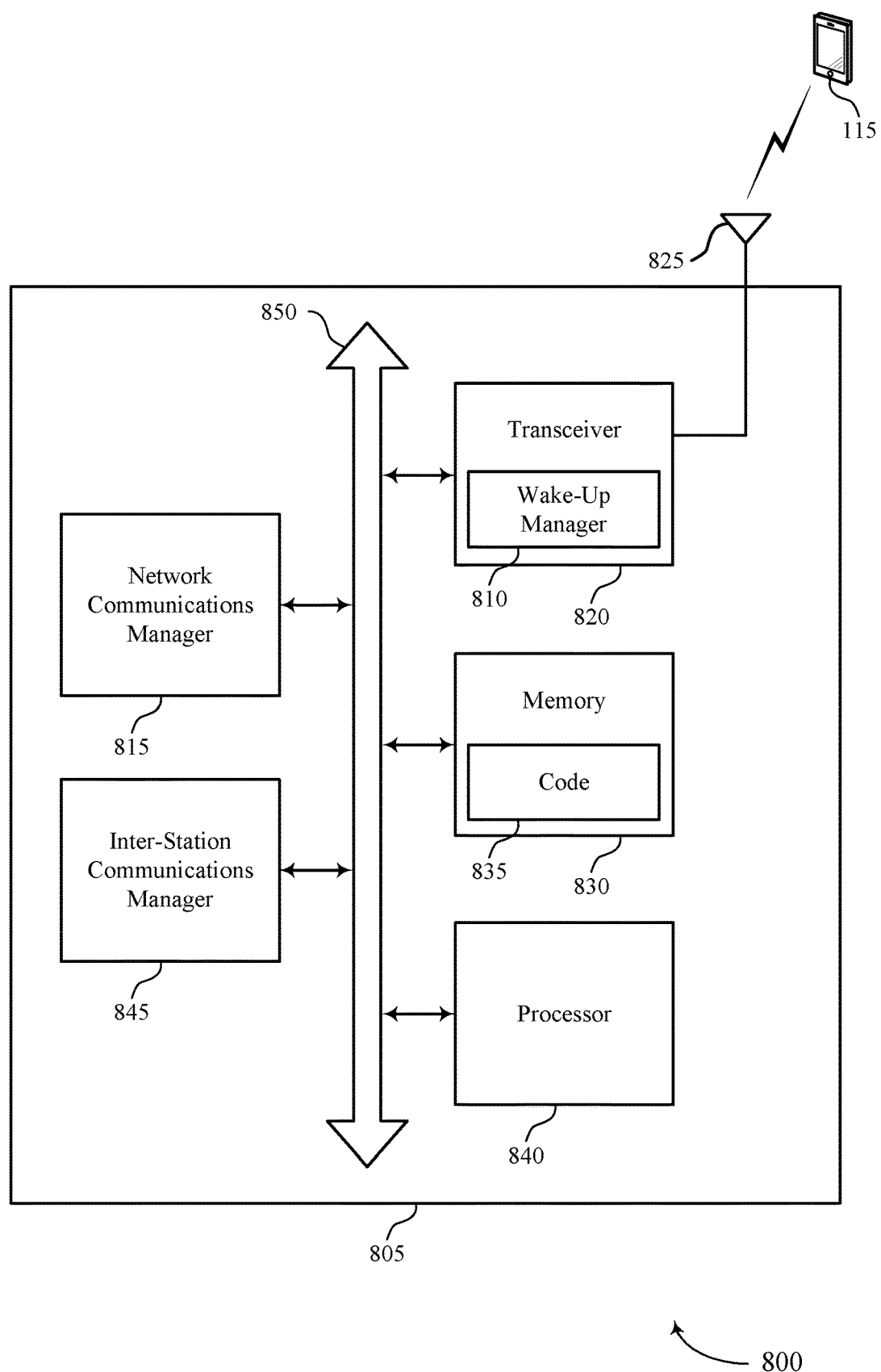
FIG. 8 shows a block diagram of an example system including a device that supports a wake-up procedure using a determined tone sequence.

FIG. 8 shows an example block diagram of a system 800 including a device 805 that supports a wake-up procedure using a determined tone sequence. The device 805 may be an example of or include the components of an AP 105 as described herein. The device 805 may include components for bi-directional voice and data communications including components for transmitting and receiving communications, including a wake-up manager 810, a network communications manager 815, a transceiver 820, an antenna 825, memory 830, a processor 840, and an inter-station communications manager 845. These components may be in electronic communication via one or more buses (such as bus 850).

The wake-up manager 810 may determine that a STA 115 associated with the AP 105 is to be awakened from a low power mode, generate a wake-up packet for reception by a wake-up radio of the STA 115 to trigger wake-up of the STA 115, the wake-up packet including a tone sequence for an ON symbol of the wake-up packet where the tone sequence satisfies a correlation metric threshold, and transmit the wake-up packet to the STA 115. In some implementations, the wake-up manager 810 may be a component of the transceiver 820.

In some examples, the wake-up manager 810, when functioning as a processor or a processing system, may obtain the signaling from a receiver, such as the transceiver 820, using a second interface and may output signaling for transmission via a transmitter, such as the transceiver 820, using a first interface.

The network communications manager 815 may manage communications with a core network (such as via one or more wired backhaul links). For example, the network communications manager 815 may manage the transfer of data communications for client devices, such as one or more STAs 115.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 also may include a modem to modulate the packets and provide the modulated packets to the antennas for transmission, and to demodulate packets received from the antennas.

In some implementations, the wireless device may include a single antenna 825. However, in some other implementations, the device may have more than one antenna 825 which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed by a processor (such as the processor 840) cause the device 805 to perform various functions described herein. In some implementations, the memory 830 may contain, among other things, a basic input/output system (BIOS) which may control basic hardware or software operation such as the interaction with peripheral components or devices.

The processor 840 may include a hardware device (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). The processor 840 may be configured to execute computer-readable instructions stored in a memory (such as the memory 830) to cause the device 805 to perform various functions (such as functions or tasks supporting wake-up procedures).

The processor 840 may be any one or more suitable processors capable of executing scripts or instructions of one or more software programs stored in the device 805 (such as within the memory 830). For example, the processor 840 may execute the wake-up manager 810.

In some implementations, the processor 840 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or sub-components of the device 805.

The processing system of the device 805 may interface with other components of the device 805 and may process information received from other components (such as inputs or signals), output information to other components, etc. For example, a chip or modem of the device 805 may include a processing system, a first interface to output information, and a second interface to obtain information. In some cases, the first interface may refer to an interface between the processing system of the chip or modem and a transmitter, such that the device 805 may transmit information output from the chip or modem. In some cases, the second interface may refer to an interface between the processing system of the chip or modem and a receiver, such that the device 805 may obtain information or signal inputs, and the information may be passed to the processing system. A person having ordinary skill in the art will readily recognize that the first interface also may obtain information or signal inputs, and the second interface also may output information or signal outputs.

The inter-station communications manager 845 may manage communications with other APs 105 and may include a controller or scheduler for controlling communications with STAs 115 in cooperation with other APs 105. For example, the inter-station communications manager 845 may coordinate scheduling for transmissions to STAs 115 for various interference mitigation techniques such as beamforming or joint transmission. In some implementations, the inter-station communications manager 845 may provide an X2 interface within a wireless communication network technology to provide communication between APs 105.

The code 835 may include instructions to implement aspects of the present disclosure, including instructions to support wireless communications. In some implementations, the code 835 may not be directly executable by the processor 840 but may cause a computer (such as when compiled and executed) to perform functions described herein.

Additionally, or alternatively, the device 805 may include one or more interfaces and a processing system. The processing system may be in electronic communication with the one or more interfaces. In some implementations, the interfaces and processing system may be components of a chip or modem, which may be a component of the device 805. The processing system and one or more interfaces may include aspects of the wake-up manager 810, the memory 830, the processor 840, or a combination thereof. The processing system and one or more interfaces also may be in electronic communication with the network communications manager 815, the inter-station communications manager 845, the transceiver 820, or a combination thereof (such as via the bus 850).

For example, a first interface may be configured to obtain information from other components of the device 805. A second interface may be configured to output information to other components of the device 805. The information may be sent and received in the form of encoded or unencoded bits. The processing system may perform any number of processes to modify or determine the information output from the second interface.

In some implementations, the processing system may be configured to determine that a STA 115 associated with the AP 105 is to be awakened from a low power mode. The processing system may generate a wake-up packet for reception by a wake-up radio of the STA 115 to trigger wake-up of the STA 115, the wake-up packet including a tone sequence for an ON symbol of the wake-up packet, where the tone sequence satisfies a correlation metric threshold (for example, a maximum correlation metric threshold). An interface (for example, the second interface described herein) may be configured to output the wake-up packet for transmission to the STA 115.

Figure 9:
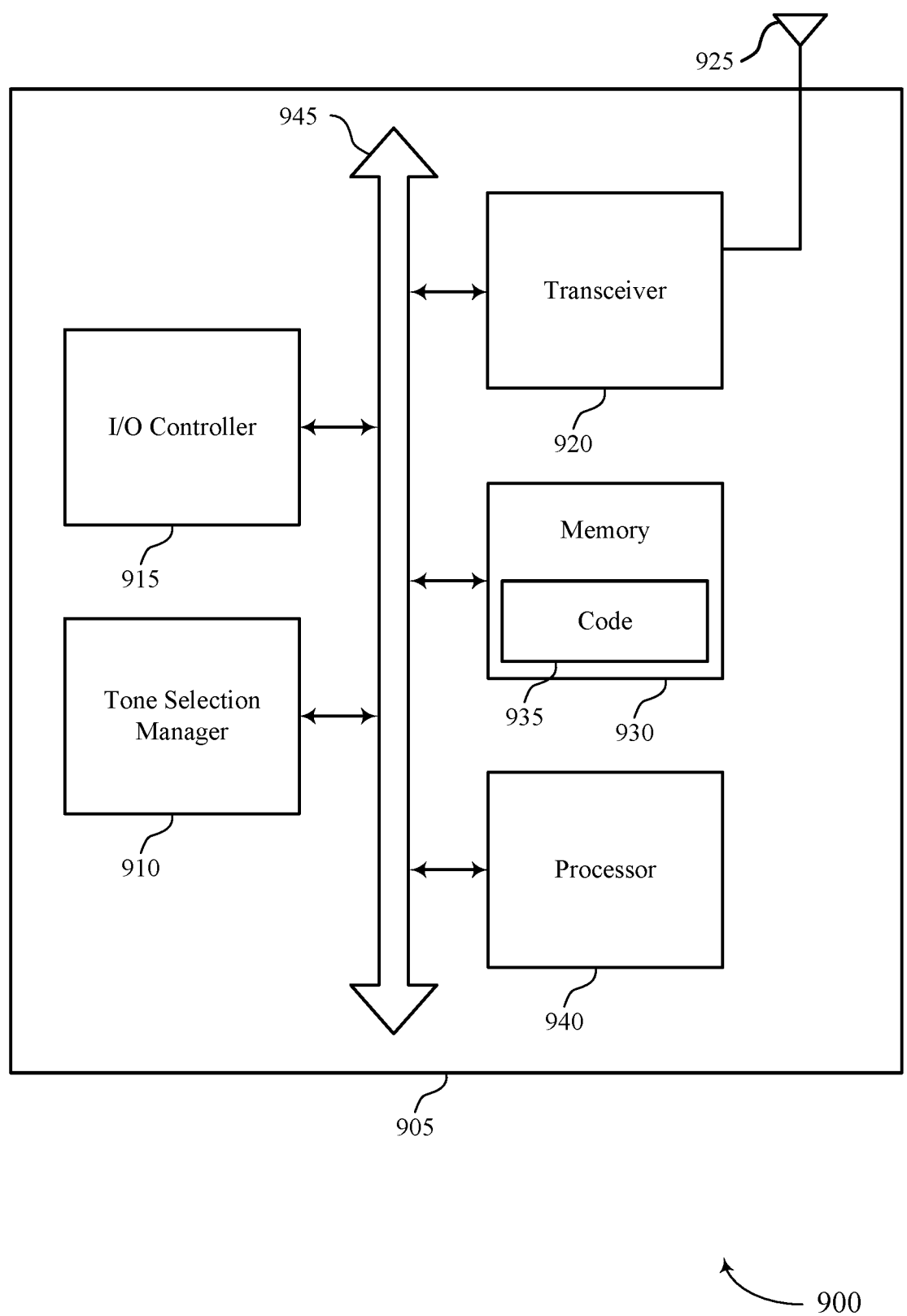
FIG. 9 shows a block diagram of an example system including a device that supports determining a tone sequence.

FIG. 9 shows an example block diagram of a system 900 including a device 905 that supports determining a tone sequence. The device 905 may be an example of or include the components of an AP 105, a STA 115, or another computing device as described herein. The device 905 may include components for bi-directional voice and data communications including components for transmitting and receiving communications. In some implementations, the device 905 may include a tone selection manager 910, an input/output (I/O) controller 915, a transceiver 920, an antenna 925, memory 930, a processor 940, or some combination thereof. These components may be in electronic communication via one or more buses (such as bus 945).

The tone selection manager 910 may select a tone sequence. The tone selection manager 910 may identify a set of candidate tone sequences, store, in memory and in association with an identifier for corresponding candidate tone sequences, a correlation metric and a PAPR for each of the set of candidate tone sequences, and associate the correlation metric and the PAPR for each of the set of candidate tone sequences into a set of coordinate pairs, each pair representative of one of the set of candidate tone sequences. The tone selection manager 910 may identify one or more of the coordinate pairs that define a lower convex hull of the set of coordinate pairs and may select a tone sequence from the one or more coordinate pairs that define the lower convex hull. The tone sequence may be selected for an ON symbol of a wake-up packet. In some examples, the tone selection manager 910 may select the tone sequence for the ON symbol of the wake-up packet to be transmitted by an AP 105 and received by a wake-up radio of a STA 115 to trigger wake-up of the STA 115.

The I/O controller 915 may manage input and output signals for the device 905. The I/O controller 915 also may manage peripherals not integrated into the device 905. In some implementations, the I/O controller 915 may represent a physical connection or port to an external peripheral. In some examples, the I/O controller 915 may utilize an operating system such as iOS®, ANDROID®, MS-DOS®, MS-WINDOWS®, OS/2®, UNIX®, LINUX®, or another known operating system. In some other examples, the I/O controller 915 may represent or interact with a modem, a keyboard, a mouse, a touchscreen, or a similar device. In some examples, the I/O controller 915 may be implemented as part of a processor. In some examples, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 also may include a modem to modulate the packets and provide the modulated packets to the antennas for transmission, and to demodulate packets received from the antennas.

In some implementations, the wireless device may include a single antenna 925. However, in some implementations the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some examples, the memory 930 may contain, among other things, a BIOS which may control basic hardware or software operation such as the interaction with peripheral components or devices.

The processor 940 may include a hardware device (such as a general-purpose processor, a DSP, a CPU, a microcontroller, an ASIC, an FPGA, a programmable logic device, a discrete gate or transistor logic component, a discrete hardware component, or any combination thereof). In some examples, the processor 940 may be configured to operate a memory array using a memory controller. In some other examples, a memory controller may be integrated into the processor 940. The processor 940 may be configured to execute computer-readable instructions stored in a memory (such as the memory 930) to cause the device 905 to perform various functions (such as functions or tasks supporting determining a tone sequence).

The processor 940 may be any one or more suitable processors capable of executing scripts or instructions of one or more software programs stored in the device 905 (such as within the memory 930). For example, the processor 940 may execute the tone selection manager 910 or the I/O controller 915.

In some implementations, the processor 940 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905.

The processing system of the device 905 may interface with other components of the device 905 and may process information received from other components (such as inputs or signals), output information to other components, etc. For example, a chip or modem of the device 905 may include a processing system, a first interface to output information, and a second interface to obtain information. In some cases, the first interface may refer to an interface between the processing system of the chip or modem and a transmitter, such that the device 905 may transmit information output from the chip or modem. In some cases, the second interface may refer to an interface between the processing system of the chip or modem and a receiver, such that the device 905 may obtain information or signal inputs, and the information may be passed to the processing system. A person having ordinary skill in the art will readily recognize that the first interface also may obtain information or signal inputs, and the second interface also may output information or signal outputs.

The code 935 may include instructions to implement aspects of the present disclosure, including instructions to support wireless communications. The code 935 may be stored in a non-transitory computer-readable medium such as system memory or other type of memory. In some implementations, the code 935 may not be directly executable by the processor 940 but may cause a computer (such as when compiled and executed) to perform functions described herein.

Additionally, or alternatively, the device 905 may include one or more interfaces and a processing system. The processing system may be in electronic communication with the one or more interfaces. In some implementations, the interfaces and processing system may be components of a chip or modem, which may be a component of the device 905. The processing system and one or more interfaces may include aspects of the tone selection manager 910, the memory 930, the processor 940, or a combination thereof. The processing system and one or more interfaces also may be in electronic communication with the I/O controller 915, the transceiver 920, or both (such as via the bus 945).

In some implementations, a first interface may be configured to output information to other components of the device 905. A second interface may be configured to obtain information from other components of the device 905. The information may be sent and received in the form of encoded or unencoded bits. The processing system may perform any number of processes to modify or determine information (such as information related to tone sequence selection).

In some implementations, the processing system may support selection of a tone sequence. The processing system may be configured to identify a set of candidate tone sequences, store, in memory and in association with an identifier for corresponding candidate tone sequences, a correlation metric and a PAPR for each of the set of candidate tone sequences, and associate the correlation metric and the PAPR for each of the set of candidate tone sequences into a set of coordinate pairs, each pair representative of one of the set of candidate tone sequences. The processing system may be further configured to identify one or more of the coordinate pairs that define a lower convex hull of the set of coordinate pairs and may select a tone sequence from the one or more coordinate pairs that define the lower convex hull. The tone sequence may be selected for an ON symbol of a wake-up packet.

In some examples, the tone selection manager 910 may be implemented as an integrated circuit or chipset for a mobile device modem, and the I/O controller 915 and the transceiver 920 may be implemented as analog components (for example, amplifiers, filters, antennas, etc.) coupled with the mobile device modem to enable wireless transmission and reception.

The tone selection manager 910 as described herein may be implemented to realize one or more potential advantages. Various implementations may decrease the number of false detections made by the device 905 on packets not intended for the device 905 and may decrease the number of times the device 905 fails to receive other packets intended for the device 905. At least one implementation may enable the tone selection manager 910 to increase the amount of time that the device 905 may remain in a deep sleep mode.

Based on implementing the techniques for determining a tone sequence as described herein, one or more processors of the device 905 (for example, processor(s) controlling or incorporated with one or more of the transceiver 920, the tone selection manager 910, and the I/O controller 915) may increase battery life of the device 905 by reducing the amount of time the device 905 is awake and monitoring for a packet transmission. In addition, limiting false detections by the device 905 may increase overall communication efficiency in the wireless network by supporting reliable packet reception.

Figure 10:
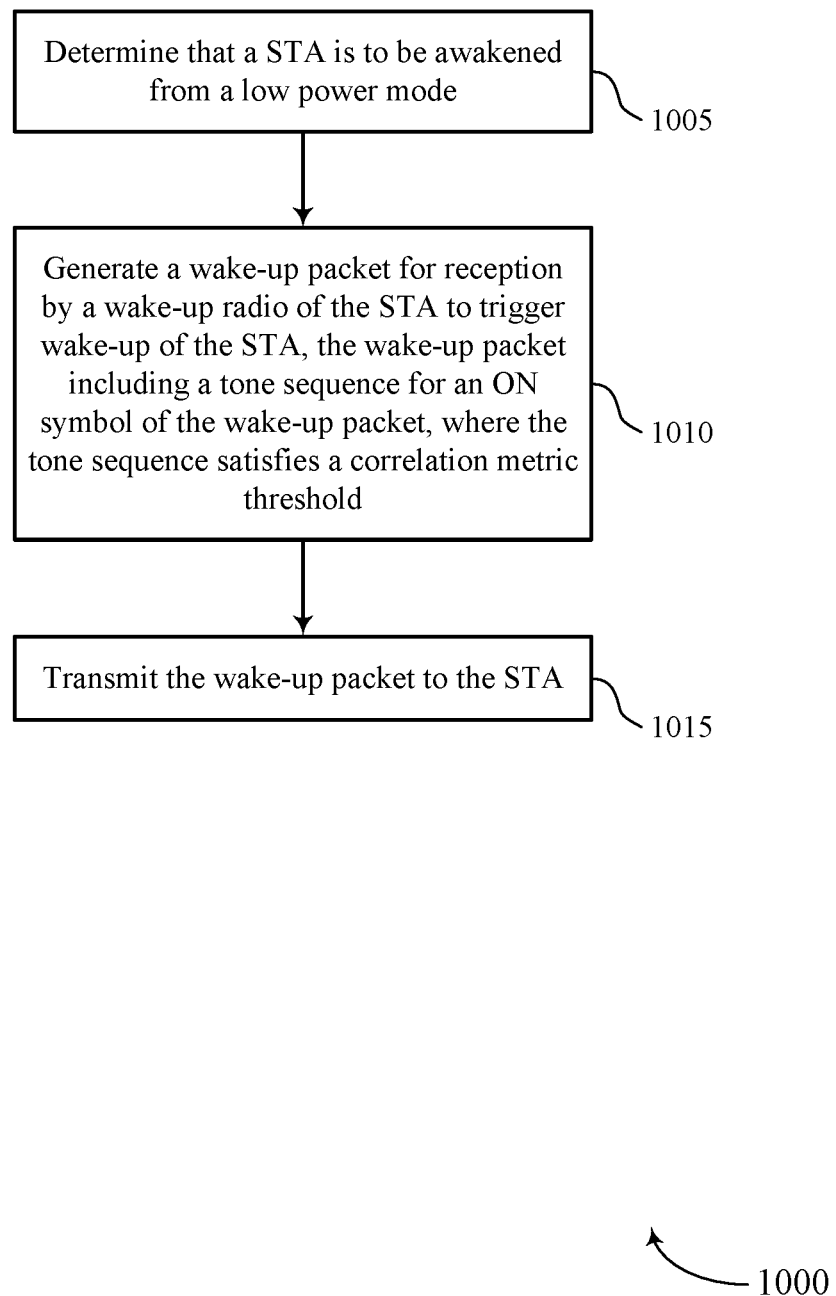
FIGS. 10-13 show flowcharts illustrating example methods for determining tone sequences, performing wake-up procedures, or both.

FIG. 10 shows a flowchart illustrating an example method 1000 for determining tone sequences, performing wake-up procedures, or both. The operations of the method 1000 may be implemented by an AP 105 or its components as described herein. For example, the operations of the method 1000 may be performed by a wake-up manager as described with reference to FIG. 8. In some implementations, an AP 105 may execute a set of instructions to control the functional elements of the AP 105 to perform the functions described below. Additionally, or alternatively, an AP 105 may perform aspects of the functions described below using special-purpose hardware.

At 1005, the AP 105 may determine that a STA 115 associated with the AP 105 is to be awakened from a low power mode. The operations of 1005 may be performed according to the methods described herein.

At 1010, the AP 105 may generate a wake-up packet for reception by a wake-up radio of the STA 115 to trigger wake-up of the STA 115, the wake-up packet including a tone sequence for an ON symbol of the wake-up packet, where the tone sequence satisfies a correlation metric threshold. The operations of 1010 may be performed according to the methods described herein.

At 1015, the AP 105 may transmit the wake-up packet to the STA 115. The operations of 1015 may be performed according to the methods described herein.

Figure 11:
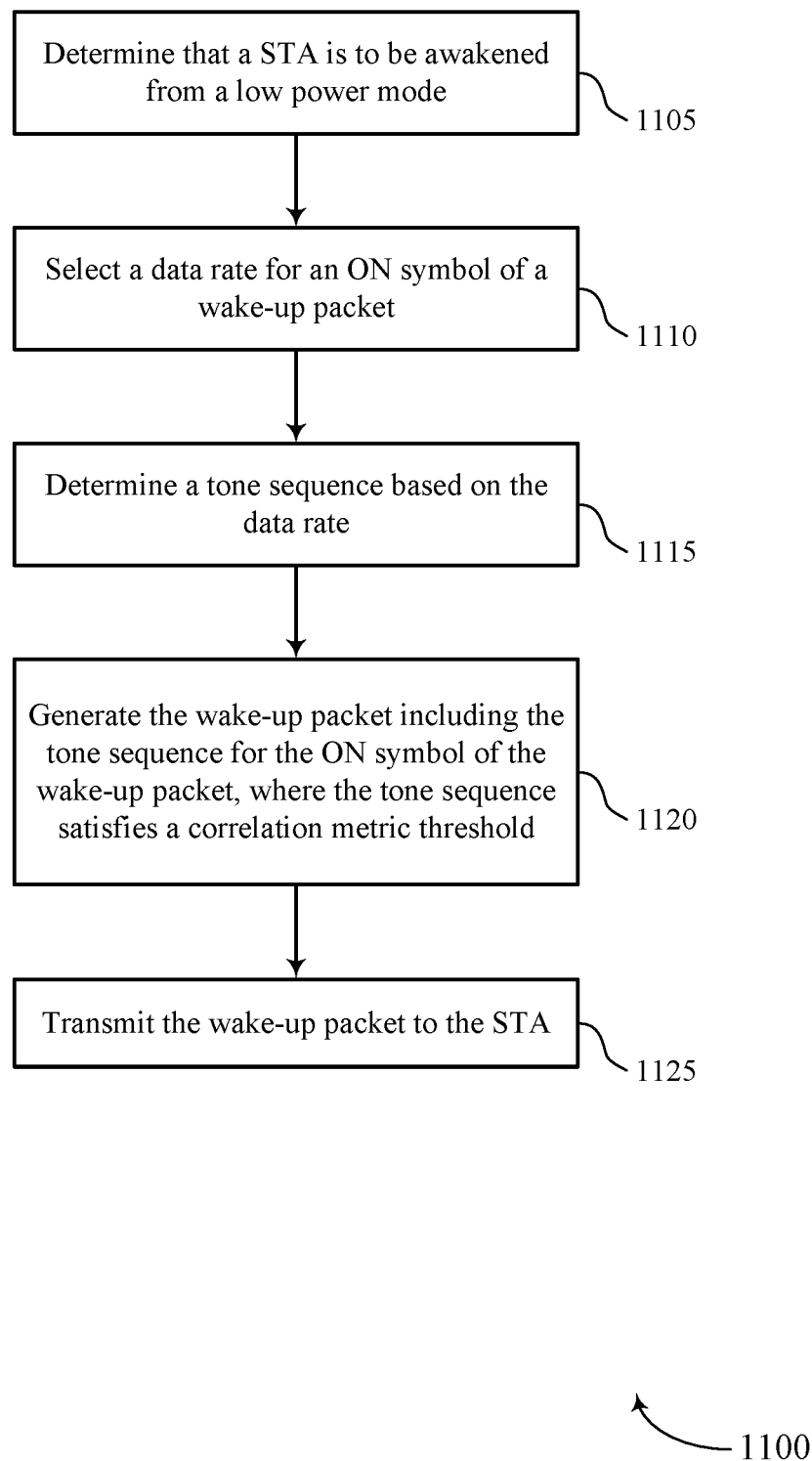

FIG. 11 shows a flowchart illustrating an example method 1100 for determining tone sequences, performing wake-up procedures, or both. The operations of the method 1100 may be implemented by an AP 105 or its components as described herein. For example, the operations of the method 1100 may be performed by a wake-up manager as described with reference to FIG. 8. In some implementations, an AP 105 may execute a set of instructions to control the functional elements of the AP 105 to perform the functions described below. Additionally, or alternatively, an AP 105 may perform aspects of the functions described below using special-purpose hardware.

At 1105, the AP 105 may determine that a STA 115 associated with the AP 105 is to be awakened from a low power mode. The operations of 1105 may be performed according to the methods described herein.

At 1110, the AP 105 may select a data rate for an ON symbol of a wake-up packet. The operations of 1110 may be performed according to the methods described herein.

At 1115, the AP 105 may determine a tone sequence based on the data rate. The operations of 1115 may be performed according to the methods described herein.

At 1120, the AP 105 may generate the wake-up packet for reception by a wake-up radio of the STA 115 to trigger wake-up of the STA 115, the wake-up packet including the tone sequence for the ON symbol of the wake-up packet, where the tone sequence satisfies a correlation metric threshold. The operations of 1120 may be performed according to the methods described herein.

At 1125, the AP 105 may transmit the wake-up packet to the STA 115. The operations of 1125 may be performed according to the methods described herein.

Figure 12:
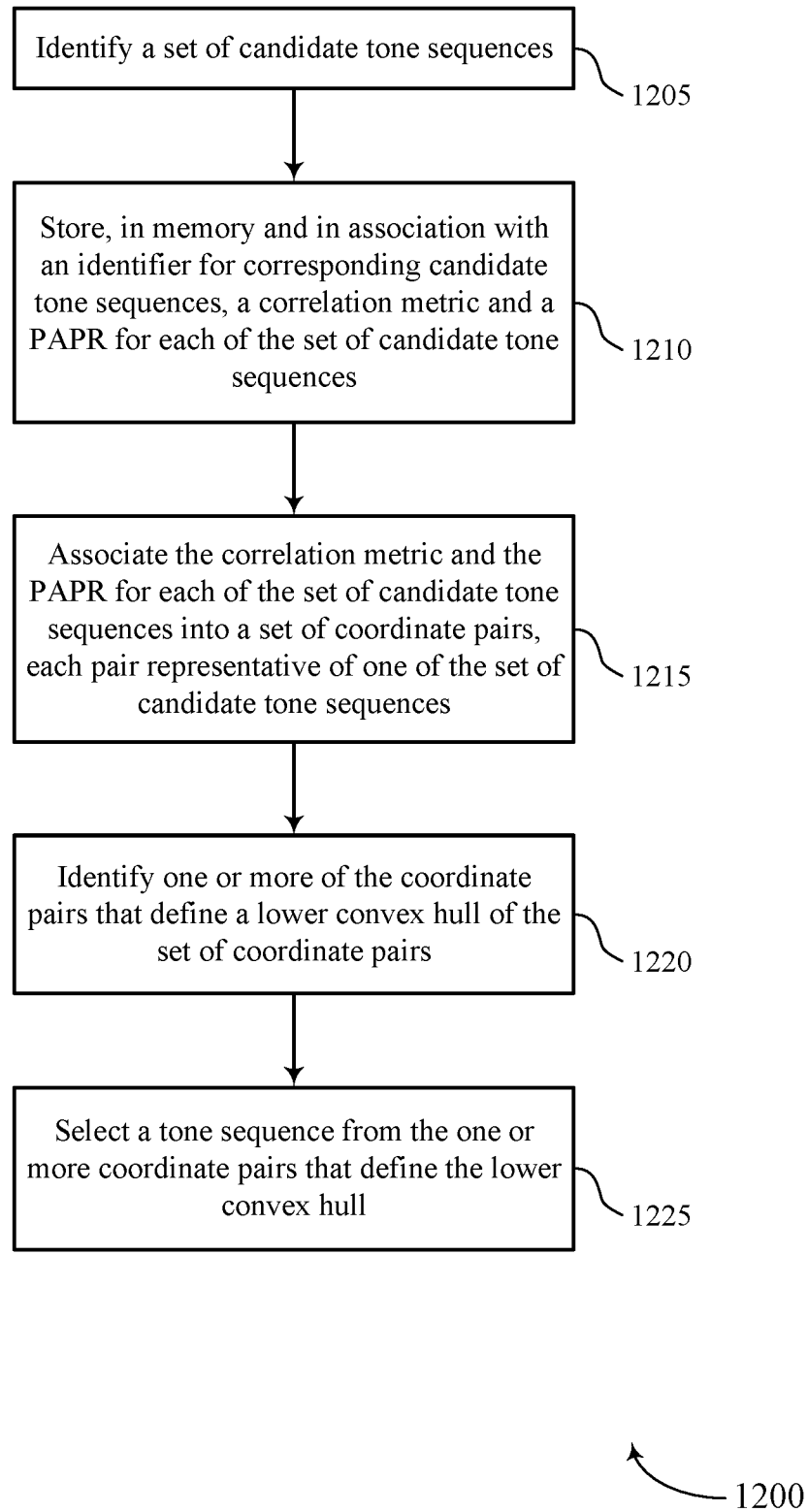

FIG. 12 shows a flowchart illustrating an example method 1200 for determining tone sequences, performing wake-up procedures, or both. The operations of the method 1200 may be implemented by a device or its components as described herein. For example, the operations of the method 1200 may be performed by a tone selection manager as described with reference to FIG. 9. In some implementations, a device may execute a set of instructions to control the functional elements of the device to perform the functions described below. Additionally, or alternatively, a device may perform aspects of the functions described below using special-purpose hardware. The device may perform selection of a tone sequence.

At 1205, the device may identify a set of candidate tone sequences. The operations of 1205 may be performed according to the methods described herein.

At 1210, the device may store, in memory and in association with an identifier for corresponding candidate tone sequences, a correlation metric and a PAPR for each of the set of candidate tone sequences. The operations of 1210 may be performed according to the methods described herein.

At 1215, the device may associate the correlation metric and the PAPR for each of the set of candidate tone sequences into a set of coordinate pairs, each pair representative of one of the set of candidate tone sequences. The operations of 1215 may be performed according to the methods described herein.

At 1220, the device may identify one or more of the coordinate pairs that define a lower convex hull of the set of coordinate pairs. The operations of 1220 may be performed according to the methods described herein.

At 1225, the device may select the tone sequence for an ON symbol of a wake-up packet from the one or more coordinate pairs that define the lower convex hull. The operations of 1225 may be performed according to the methods described herein.

Figure 13:
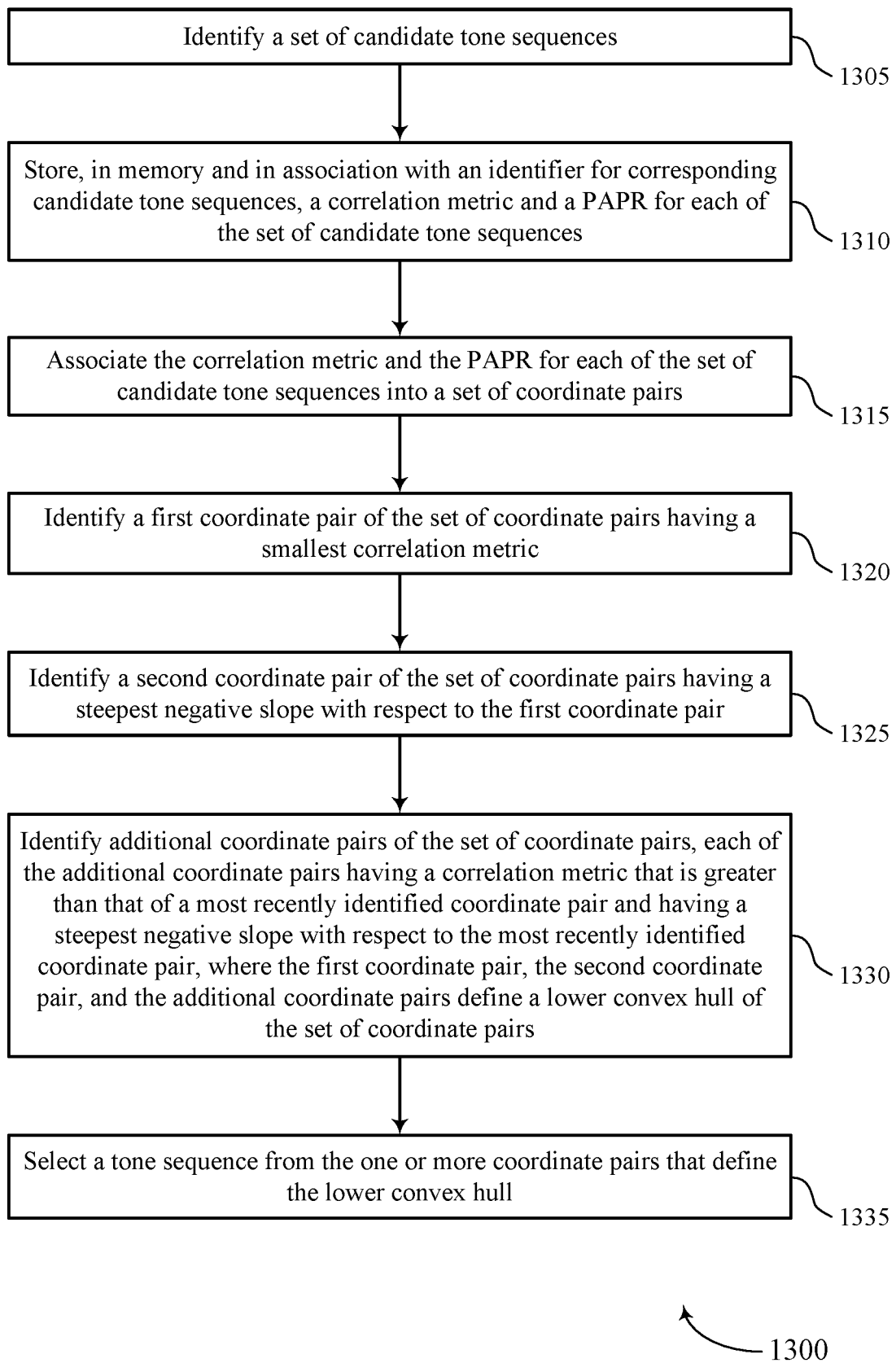

FIG. 13 shows a flowchart illustrating an example method 1300 for determining tone sequences, performing wake-up procedures, or both. The operations of method 1300 may be implemented by a device or its components as described herein. For example, the operations of method 1300 may be performed by a tone selection manager as described with reference to FIG. 9. In some implementations, a device may execute a set of instructions to control the functional elements of the device to perform the functions described below. Additionally, or alternatively, a device may perform aspects of the functions described below using special-purpose hardware. The device may perform selection of a tone sequence.

At 1305, the device may identify a set of candidate tone sequences. The operations of 1305 may be performed according to the methods described herein.

At 1310, the device may store, in memory and in association with an identifier for corresponding candidate tone sequences, a correlation metric and a PAPR for each of the set of candidate tone sequences. The operations of 1310 may be performed according to the methods described herein.

At 1315, the device may associate the correlation metric and the PAPR for each of the set of candidate tone sequences into a set of coordinate pairs, each pair representative of one of the set of candidate tone sequences. The operations of 1315 may be performed according to the methods described herein.

At 1320, the device may identify a first coordinate pair of the set of coordinate pairs having a smallest correlation metric. The operations of 1320 may be performed according to the methods described herein.

At 1325, the device may identify a second coordinate pair of the set of coordinate pairs having a steepest negative slope with respect to the first coordinate pair. The operations of 1325 may be performed according to the methods described herein.

At 1330, the device may identify additional coordinate pairs of the set of coordinate pairs, each of the additional coordinate pairs having a correlation metric that is greater than that of a most recently identified coordinate pair and having a steepest negative slope with respect to the most recently identified coordinate pair. In some implementations, the first coordinate pair, the second coordinate pair, and the additional coordinate pairs define a lower convex hull of the set of coordinate pairs. The operations of 1330 may be performed according to the methods described herein.

At 1335, the device may select the tone sequence for an ON symbol of a wake-up packet from the one or more coordinate pairs that define the lower convex hull. The operations of 1335 may be performed according to the methods described herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a DSP, an ASIC, an FPGA or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus of an access point (AP) for wireless communications, comprising:
a processing system configured to:
determine that a station (STA) associated with the AP is to be awakened from a low power mode; and
generate a wake-up packet for reception by a wake-up radio of the STA to trigger wake-up of the STA, the wake-up packet including a tone sequence for an ON symbol of the wake-up packet, wherein the tone sequence is associated with a maximum correlation metric that is less than a maximum correlation metric threshold; and
an interface configured to:
output the wake-up packet for transmission to the STA.

2. The apparatus of claim 1, wherein:
each of a plurality of cyclic shifts of the ON symbol satisfy the maximum correlation metric threshold.

3. The apparatus of claim 1, wherein:
the maximum correlation metric is based at least in part on a maximum value of a plurality of absolute values of normalized auto-correlations over one or more sample start times of the tone sequence, one or more repetition numbers of the tone sequence, or a combination thereof.

4. The apparatus of claim 3, wherein:
the normalized auto-correlations correspond to repetition intervals over a length of time equal to a short training sequence duration within the ON symbol using the tone sequence.

5. The apparatus of claim 1, wherein:
the tone sequence further comprises a maximum peak-to-average-power ratio that satisfies a maximum peak-to-average-power ratio threshold by being less than the maximum peak-to-average-power ratio threshold.

6. The apparatus of claim 5, wherein:
satisfaction of the maximum peak-to-average-power ratio threshold is based at least in part on each of a plurality of cyclic shifts of the ON symbol satisfying the maximum peak-to-average-power ratio threshold.

7. The apparatus of claim 1, wherein:
the tone sequence comprises a binary phase shift keying modulated tone sequence, a quadrature phase shift keying modulated tone sequence, a quadrature amplitude modulated tone sequence, or a combination thereof.

8. The apparatus of claim 1, wherein:
the processing system is further configured to:
select a data rate for the ON symbol of the wake-up packet; and
determine the tone sequence based at least in part on the data rate.

9. The apparatus of claim 8, wherein:
the data rate comprises a high data rate and the ON symbol spans a first time period and uses a first number of subcarriers; or
the data rate comprises a low data rate and the ON symbol spans a second time period longer than the first time period and uses a second number of subcarriers greater than the first number of subcarriers.

10. The apparatus of claim 1, wherein:
the tone sequence comprises one of the following sequences:
[1 −1 1 1 −1 −1 0 −1 1 1 −1 −1 −1], [−1 1 1 −1 −1 1 0 1 −1 −1 −1 −1 −1], [1 −1 1 1 −1 1 0 1 1 1 −1 −1 −1], [1 −1 1 −1 −1 −1 0 −1 1 −1 −1 −1 −1], [−1 1 −1 1 1 −1 0 1 1 −1 −1 −1 −1], or [−1 1 1 1 −1 1 0 −1 −1 −1 1 −1 −1].

11. An apparatus for selection of a tone sequence, comprising:
a memory; and
a processing system configured to:
identify a plurality of candidate tone sequences;
store, in the memory and in association with an identifier for corresponding candidate tone sequences, a correlation metric and a peak-to-average-power ratio for each of the plurality of candidate tone sequences;
associate the correlation metric and the peak-to-average-power ratio for each of the plurality of candidate tone sequences into a plurality of coordinate pairs, each pair representative of one of the plurality of candidate tone sequences;
identify one or more of the plurality of coordinate pairs that define a lower convex hull of the plurality of coordinate pairs; and
select the tone sequence for an ON symbol of a wake-up packet from the one or more coordinate pairs that define the lower convex hull.

12. The apparatus of claim 11, wherein:
the processing system configured to identify the one or more of the plurality of coordinate pairs that define the lower convex hull of the plurality of coordinate pairs is further configured to:
identify a first coordinate pair of the plurality of coordinate pairs having a smallest correlation metric;
identify a second coordinate pair of the plurality of coordinate pairs having a steepest negative slope with respect to the first coordinate pair; and
identify additional coordinate pairs of the plurality of coordinate pairs, each of the additional coordinate pairs having a correlation metric that is greater than that of a most recently identified coordinate pair and having a steepest negative slope with respect to the most recently identified coordinate pair,
wherein the first coordinate pair, the second coordinate pair, and the additional coordinate pairs comprise the one or more of the plurality of coordinate pairs that define the lower convex hull of the plurality of coordinate pairs.

13. The apparatus of claim 12, wherein:
the processing system is further configured to:
sort the plurality of coordinate pairs based on the peak-to-average-power ratio prior to identifying the first coordinate pair.

14. The apparatus of claim 11, wherein:
the processing system configured to identify the one or more of the plurality of coordinate pairs that define the lower convex hull of the plurality of coordinate pairs is further configured to:

represent the plurality of coordinate pairs in a scatter plot with a first axis representing the correlation metric and a second axis representing a peak-to-average-power ratio grid; and
identify the one or more of the plurality of coordinate pairs from the lower convex hull of the scatter plot.

15. The apparatus of claim 11, wherein:
the correlation metric for each candidate tone sequence of the plurality of candidate tone sequences comprises a maximum correlation metric for each candidate tone sequence; and
the peak-to-average-power ratio for each candidate tone sequence of the plurality of candidate tone sequences comprises a maximum peak-to-average-power ratio for each candidate tone sequence.

16. A method for wireless communications at an apparatus of an access point (AP), comprising:
determining that a station (STA) associated with the AP is to be awakened from a low power mode;
generating a wake-up packet for reception by a wake-up radio of the STA to trigger wake-up of the STA, the wake-up packet including a tone sequence for an ON symbol of the wake-up packet, wherein the tone sequence is associated with a maximum correlation metric that is less than a maximum correlation metric threshold; and
transmitting the wake-up packet to the STA.

17. The method of claim 16, wherein:
each of a plurality of cyclic shifts of the ON symbol satisfy the maximum correlation metric threshold.

18. The method of claim 16, wherein:
the maximum correlation metric is based at least in part on a maximum value of a plurality of absolute values of normalized auto-correlations over one or more sample start times of the tone sequence, one or more repetition numbers of the tone sequence, or a combination thereof.

19. The method of claim 16, wherein:
the tone sequence comprises one of the following sequences:
[1 −1 1 1 −1 −1 0 −1 1 1 −1 −1 −1], [−1 1 1 −1 −1 1 0 1 −1 −1 −1 −1 −1], [1 −1 1 1 −1 1 0 1 1 1 −1 −1 −1], [1 −1 1 −1 −1 −1 0 −1 1 −1 −1 −1 −1], [−1 1 −1 1 1 −1 0 1 1 −1 −1 −1 −1], or [−1 1 1 1 −1 1 0 −1 −1 −1 1 1 −1 −1].

20. The method of claim 18, wherein:
the normalized auto-correlations correspond to repetition intervals over a length of time equal to a short training sequence duration within the ON symbol using the tone sequence.

21. The method of claim 16, wherein:
the tone sequence further comprises a maximum peak-to-average-power ratio that satisfies a maximum peak-to-average-power ratio threshold by being less than the maximum peak-to-average-power ratio threshold.

22. The method of claim 21, wherein:
satisfaction of the maximum peak-to-average-power ratio threshold is based at least in part on each of a plurality of cyclic shifts of the ON symbol satisfying the maximum peak-to-average-power ratio threshold.

23. The method of claim 16, wherein:
the tone sequence comprises a binary phase shift keying modulated tone sequence, a quadrature phase shift keying modulated tone sequence, a quadrature amplitude modulated tone sequence, or a combination thereof.

24. The method of claim 16, further comprising:
selecting a data rate for the ON symbol of the wake-up packet; and
determining the tone sequence based at least in part on the data rate.

25. The method of claim 24, wherein:
the data rate comprises a high data rate and the ON symbol spans a first time period and uses a first number of subcarriers; or
the data rate comprises a low data rate and the ON symbol spans a second time period longer than the first time period and uses a second number of subcarriers greater than the first number of subcarriers.

26. A method for selection of a tone sequence, comprising:
identifying a plurality of candidate tone sequences;
storing, in memory and in association with an identifier for corresponding candidate tone sequences, a correlation metric and a peak-to-average-power ratio for each of the plurality of candidate tone sequences;
associating the correlation metric and the peak-to-average-power ratio for each of the plurality of candidate tone sequences into a plurality of coordinate pairs, each pair representative of one of the plurality of candidate tone sequences;
identifying one or more of the plurality of coordinate pairs that define a lower convex hull of the plurality of coordinate pairs; and
selecting the tone sequence for an ON symbol of a wake-up packet from the one or more coordinate pairs that define the lower convex hull.

27. The method of claim 26, wherein:
identifying the one or more of the plurality of coordinate pairs that define the lower convex hull of the plurality of coordinate pairs comprises:
identifying a first coordinate pair of the plurality of coordinate pairs having a smallest correlation metric;
identifying a second coordinate pair of the plurality of coordinate pairs having a steepest negative slope with respect to the first coordinate pair; and
identifying additional coordinate pairs of the plurality of coordinate pairs, each of the additional coordinate pairs having a correlation metric that is greater than that of a most recently identified coordinate pair and having a steepest negative slope with respect to the most recently identified coordinate pair,
wherein the first coordinate pair, the second coordinate pair, and the additional coordinate pairs comprise the one or more of the plurality of coordinate pairs that define the lower convex hull of the plurality of coordinate pairs.

28. The method of claim 27, further comprising:
sorting the plurality of coordinate pairs based on the peak-to-average-power ratio prior to identifying the first coordinate pair.

29. The method of claim 26, wherein:
identifying the one or more of the plurality of coordinate pairs that define the lower convex hull of the plurality of coordinate pairs comprises:
representing the plurality of coordinate pairs in a scatter plot with a first axis representing the correlation metric and a second axis representing a peak-to-average-power ratio grid; and
identifying the one or more of the plurality of coordinate pairs from the lower convex hull of the scatter plot.

30. The method of claim 26, wherein:
the correlation metric for each candidate tone sequence of the plurality of candidate tone sequences comprises a maximum correlation metric for each candidate tone sequence; and
the peak-to-average-power ratio for each candidate tone sequence of the plurality of candidate tone sequences comprises a maximum peak-to-average-power ratio for each candidate tone sequence.

* * * * *